United States Patent
Yabuki et al.

(10) Patent No.: US 7,281,788 B2
(45) Date of Patent: Oct. 16, 2007

(54) INK FOR INKJET RECORDING, INK SET FOR INKJET RECORDING AND INKJET RECORDING METHOD

(75) Inventors: Yoshiharu Yabuki, Minami-Ashigara (JP); Toshiki Fujiwara, Minami-Ashigara (JP); Toru Harada, Minami-Ashigara (JP); Tomohiro Chino, Minami-Ashigara (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 163 days.

(21) Appl. No.: 10/524,557

(22) PCT Filed: Aug. 11, 2003

(86) PCT No.: PCT/JP03/10224

§ 371 (c)(1),
(2), (4) Date: Feb. 14, 2005

(87) PCT Pub. No.: WO2004/016699

PCT Pub. Date: Feb. 26, 2004

(65) Prior Publication Data

US 2006/0164483 A1    Jul. 27, 2006

(30) Foreign Application Priority Data

Aug. 12, 2002 (JP) .............................. 2002-234819

(51) Int. Cl.
*G01D 11/00* (2006.01)
(52) U.S. Cl. ..................... 347/100; 347/95; 106/31.27; 106/31.13
(58) Field of Classification Search ................ 347/100, 347/95, 96, 101; 523/160; 106/31.6, 31.27, 106/31.13
See application file for complete search history.

(56) References Cited

U.S. PATENT DOCUMENTS

| | | | |
|---|---|---|---|
| 5,482,546 A | 1/1996 | Eida | |
| 5,686,951 A | 11/1997 | Koike et al. | |
| 5,980,623 A | 11/1999 | Chujo et al. | |
| 6,187,084 B1 | 2/2001 | Holbrook et al. | |
| 2002/0049310 A1 | 4/2002 | Azuma et al. | |
| 2002/0096086 A1 | 7/2002 | Chisholm et al. | |
| 2002/0107301 A1* | 8/2002 | Yamanouchi et al. ....... | 523/160 |

FOREIGN PATENT DOCUMENTS

| | | |
|---|---|---|
| EP | 0 802 246 | 10/1997 |
| EP | 1 048 701 | 11/2000 |
| EP | 1 182 050 | 2/2002 |
| EP | 1 209 208 | 5/2002 |
| JP | 2001 098179 | 4/2001 |
| WO | 02 38549 | 5/2002 |
| WO | WO 02/083795 A2 * | 10/2002 |

* cited by examiner

*Primary Examiner*—Manish S. Shah
(74) *Attorney, Agent, or Firm*—Buchanan Ingersoll & Rooney PC

(57) ABSTRACT

The present invention provides an ink for inkjet recording capable of giving a color image having excellent fastness to ozone gas and provides an ink set for inkjet recording and an inkjet recording method, which can form an image having excellent color reproducibility and high light fastness, in which the ink for inkjet recording includes an azo dye having a specific structure; an ink set for inkjet recording, including a yellow ink, a magenta ink and a cyan ink as minimum constituent elements, wherein these inks includes the above-described azo dye; and an inkjet recording method using the ink for inkjet recording or the ink set for inkjet recording.

10 Claims, No Drawings

INK FOR INKJET RECORDING, INK SET FOR INKJET RECORDING AND INKJET RECORDING METHOD

TECHNICAL FIELD

The present invention relates to an ink and an ink set for inkjet recording, which ensure excellent image fastness, and also relates to an inkjet recording method using the ink or ink set.

BACKGROUND ART

In recent years, the image recording material is predominated particularly by a material for forming a color image. More specifically, an inkjet system recording material, a thermal transfer-type image recording material, a recording material using an electrophotographic system, a transfer system silver halide photographic material, a printing ink, a recording pen and the like are popularly used.

In these color image recording materials, three primary color dyes (dyes or pigments) for a so-called subtractive color mixing method are used for reproducing or recording a full color image, however, a dye having absorption properties capable of realizing a preferred color reproduction region and having fastness capable of enduring various use conditions is not found at present and improvements are keenly demanded.

The inkjet recording method has been abruptly spread and is further growing because the material cost is low, high-speed recording can be obtained, noises are less generated at the recording and color recording is easy.

The inkjet recording method includes a continuous system of continuously jetting out a liquid droplet and an on-demand system of jetting out a liquid droplet according to image information signals, and the ejection system therefor includes a system of ejecting a liquid droplet by applying a pressure using a piezoelectric element, a system of ejecting a liquid droplet by generating bubbles in ink using heat, a system of using an ultrasonic wave, and a system of ejecting a liquid droplet by suction using an electrostatic force. The ink used for inkjet recording includes an aqueous ink, an oily ink and a solid (fusion-type) ink.

The coloring agent used in such an inkjet recording ink is required to have high solubility or dispersibility in a solvent, enable high-density recording, provide good color, be fast to light, heat and active gases in the environment (for example, $NO_x$, oxidative gas (e.g., ozone) and $SO_x$), exhibit excellent fastness to water and chemicals, ensure good fixing to an image-receiving material and less bleeding, give an ink having excellent storability, have high purity and no toxicity, and be available at a low cost. However, it is very difficult to find out a coloring agent satisfying these requirements in a high level. In particular, the coloring agent is strongly demanded to ensure good color for three primary colors, be fast to light, humidity and heat and at the printing on an image-receiving material having an ink-accepting layer containing a porous white inorganic pigment particle, be resistant against oxidative gases such as ozone in the environment.

Conventionally, azo dyes using a phenol, a naphthol or an aniline as the coupling component have been widely used as the dye. However, these dyes all are very poor in the fastness to oxidative gases such as ozone.

DISCLOSURE OF THE INVENTION

An object of the present invention is to solve the above-described problems in conventional techniques and provide the following dye, ink, ink set and inkjet recording method. More specifically, the object of the present invention is to provide:

1) an azo dye capable of drastically solving the ozone discoloration common to various dyes, 2) an inkjet recording ink capable of giving a color image having excellent fastness to ozone gas, and 3) an ink set for inkjet recording and an inkjet recording method, which can form an image having excellent color reproducibility and high light fastness.

As a result of extensive investigations on the reaction of azo dye and ozone, the present inventors have found that azo dyes having low reactivity with ozone have common characteristic features, that is, (i) the reaction with ozone readily takes place in hydrazo-type dyes but not in azo-type dyes, and (ii) when a hydrogen atom is present at the α-position of an alkyl group-substituted heteroatom group such as amino group or ether group used as an auxochrome, the dye exhibits high reactivity with ozone.

The alkyl group-substituted heteroatom group in which a hydrogen atom is present at the α-position is a group shown as a substituent —X—CHRR' in the following formula (2):

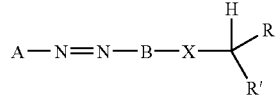

In formula (2), A and B each have the same meanings as in the following formula (1), X represents a nitrogen or oxygen atom substituted on the ring of B at the conjugated position with respect to the azo group, and R and R', which may be the same or different, each represents a hydrogen atom, an alkyl group, an aryl group or a heterocyclic group.

Furthermore, the present inventors have found that:

(iii) when an electron-withdrawing substituent is substituted, the azo dye is retarded from the reaction with ozone.

Based on these findings, the present inventors have reached an azo dye having a specific structure where a hydroxyl group (including an enol group as a tautomer of ketone) at the conjugated position of azo group, which gives rise to generation of a hydrazo-type dye, is eliminated, hydrogen at the α-position as in formula (2) is not present and preferably, an electron-withdrawing group is substituted, and the present invention has been accomplished.

More specifically, the present invention provides an ink and an ink set for inkjet recording, having the following constitutions, and an inkjet recording method.

1. An ink for inkjet recording, comprising at least one compound selected from azo dyes represented by the following formula (1):

wherein A and B each independently represents an aromatic group, or a 5- or 6-membered unsaturated heterocyclic group, provided that a substituent on each ring of A and B, which is located at a conjugated position with respect to the azo group, satisfies the following conditions (a) to (c):

(a) the substituent is not a hydroxyl group, (b) when the substituent is an amino group, the amino group does not have a hydrogen atom at the α-position, and (c) when the substituent is an ether group, the ether group does not have a hydrogen atom at the α-position.

2. The ink for inkjet recording as described in the item 1, wherein at least one of A and B in the formula (1) represents a 5- or 6-membered unsaturated heterocyclic group.

3. The ink for inkjet recording as described in the item 1 or 2, wherein the azo dye represented by the formula (1) contains an electron-withdrawing group.

4. The ink for inkjet recording as described in any one of the items 1 to 3, wherein the amino group not having a hydrogen atom at the α-position is an amino group substituted by a tertiary alkyl group, an aryl group, a heterocyclic group or an unsubstituted amino group.

5. The ink for inkjet recording as described in any one of the items 1 to 4, wherein the ether group not having a hydrogen atom at the α-position is an aryloxy group or a heteryloxy group.

6. An ink set for inkjet recording, comprising:
a yellow ink containing at least one yellow dye;
a magenta ink containing at least one magenta dye; and
a cyan ink containing at least one cyan dye,
wherein at least one dye of the yellow, magenta and cyan dyes contains an azo dye represented by the following formula (1):

A-N=N—B wherein A and B each independently represents an aromatic group, or a 5- or 6-membered unsaturated heterocyclic group, provided that a substituent on each ring of A and B, which is located at a conjugated position with respect to the azo group, satisfies the following conditions (a) to (c):
(a) the substituent is not a hydroxyl group,
(b) when the substituent is an amino group, the amino group does not have a hydrogen atom at the α-position, and
(c) when the substituent is an ether group, the ether group does not have a hydrogen atom at the α-position.

7. The ink set for inkjet recording as described in the item 6, wherein at least one of A and B in the formula (1) represents a 5- or 6-membered unsaturated heterocyclic group.

8. The ink set for inkjet recording as described in the item 6 or 7, wherein the azo dye represented by the formula (1) contains an electron-withdrawing group.

9. The ink set for inkjet recording as described in any one of the items 6 to 8, wherein the amino group not having a hydrogen atom at the α-position is an amino group substituted by a tertiary alkyl group, an aryl group, a heterocyclic group or an unsubstituted amino group.

10. The ink set for inkjet recording as described in any one of the items 6 to 9, wherein the ether group not having a hydrogen atom at the α-position is an aryloxy group or a heteryloxy group.

11. The ink set for inkjet recording as described in any one of the items 6 to 10, wherein the cyan dye includes a cyan dye represented by the following formula (3):

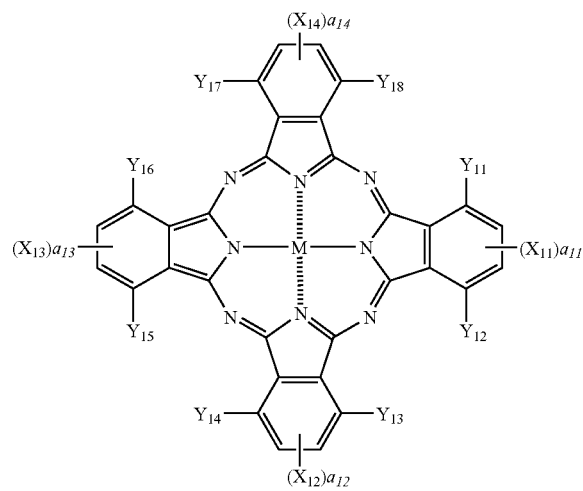

wherein $X_{11}$ to $X_{14}$ each independently represents an electron-withdrawing group having a σp value of 0.40 or more; $Y_{11}$ to $Y_{18}$ each independently represents a monovalent substituent; M represents a hydrogen atom, a metal element or its oxide, hydroxide or halide; $a_{11}$ to $a_{14}$ each independently represents an integer of 1 or 2.

12. An ink set for inkjet recording, comprising:
a yellow ink containing at least one yellow dye;
a magenta ink containing at least one magenta dye;
a cyan ink containing at least one cyan dye; and
a black ink containing at least one black dye,
wherein at least one dye of the yellow, magenta, cyan and black dyes contains an azo dye represented by the following formula (1):

A-N=N—B wherein A and B each independently represents an aromatic group, or a 5- or 6-membered unsaturated heterocyclic group, provided that a substituent on each ring of A and B, which is located at a conjugated position with respect to the azo group, satisfies the following conditions (a) to (c):
(a) the substituent is not a hydroxyl group,
(b) when the substituent is an amino group, the amino group does not have a hydrogen atom at the α-position, and
(c) when the substituent is an ether group, the ether group does not have a hydrogen atom at the α-position.

13. An inkjet recording method comprising forming an image using the ink for inkjet recording described in any one of the items 1 to 5.

14. An inkjet recording method comprising forming an image using the ink set for inkjet recording described in any one of the items 6 to 11.

15. An inkjet recording method comprising forming an image using the ink set for inkjet recording described in the item 12.

16. The inkjet recording method as described in the item 13, which comprises forming an image on an image-receiving material comprising a support having thereon an image-receiving layer containing a white inorganic pigment particle.

17. The inkjet recording method as described in the item 14, which comprises forming an image on an image-receiving material comprising a support having thereon an image-receiving layer containing a white inorganic pigment particle.

18. The inkjet recording method as described in the item 15, which comprises forming an image on an image-receiving material comprising a support having thereon an image-receiving layer containing a white inorganic pigment particle.

By using the azo dye represented by formula (1), not only the reactivity with ozone is greatly suppressed but also the light fastness is improved. Particularly, when a full color ink comprising the azo dye of the present invention is used, the balance of the image as a whole is prevented from serious disruption due to discoloration by ozone or light and a high-quality full color image is obtained. Furthermore, even in use of inks differing in the density, which are recently used for enhancing the color reproducibility, no problem arises in the fastness of light color ink. In addition, the stability of the dye itself is increased, whereby the oxidation stability of ink is enhanced and the guarantee period as a commercial product can be elongated.

BEST MODES OF CARRYING OUT THE INVENTION

The present invention is described in detail below.

[Azo Dye]

In the present invention, an azo dye represented by the following formula (1) is used.

Formula (1):

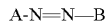

wherein A and B may be the same or different and each represents an aromatic group or a 5- or 6-membered unsaturated heterocyclic group, provided that the substituent on the A and B rings, which is located at the conjugated position with respect to the azo group, satisfies the following conditions (a) to (c):

(a) the substituent is not a hydroxyl group, (b) when the substituent is an amino group, the amino group does not have hydrogen at the $\alpha$-position, and (c) when the substituent is an ether group, the ether group does not have hydrogen at the $\alpha$-position.

The aromatic group represented by A and B means an aryl group or a substituted aryl group. The aryl group is preferably phenyl or naphthyl, more preferably phenyl. The number of carbon atoms in the aromatic group is preferably from 6 to 20, more preferably from 6 to 16.

The 5- or 6-membered unsaturated heterocyclic group may have a substituent. Examples of the unsaturated heterocyclic ring include a thiophene ring, a furan ring, a pyrrole ring, a thiazole ring, an oxazole ring, an imidazole ring, an isothiazole ring, an isoxazole ring, a pyrazole ring, a thiadiazole ring, an oxadiazole ring, a triazole ring, a pyridine ring, a pyridazine ring, a pyrimidine ring and a pyrazine ring. Among these, preferred are a thiazole ring, an isothiazole ring, a pyrazole ring, a thiadiazole ring, a triazole ring, a pyridine ring and a pyrazine ring, more preferred are an isothiazole ring, a pyrazole ring, a thiadiazole ring and a pyridine ring, and most preferred are a pyrazole ring, a 1,2,4-thiadiazole ring, a 1,3,4-thiadiazole ring and a pyridine ring.

The substituents on the unsaturated heterocyclic ring may combine with each other to form a condensed ring with the hydrocarbon ring or the unsaturated heterocyclic ring. The condensed ring may have a substituent thereon. In the case of a nitrogen-containing unsaturated heterocyclic ring, the nitrogen atom may be quaternized. In the case of an unsaturated heterocyclic ring which can form a tautomer, even when only one of tautomers is described, the ring includes other tautomers.

Preferably, at least either one of A and B is an unsaturated heterocyclic ring, and more preferably, both are an unsaturated heterocyclic ring.

The conjugated position on the rings A and B with respect to the azo group means, for example, an ortho- or para-position when A and B are a phenyl group. When A and B are not a phenyl group, the conjugated position means the same positional relationship as in the case of a phenyl group, namely, a position where a lone electron pair of the heteroatom can conjugate with the azo group when an auxochrome is substituted.

When the auxochrome is an amino group, the amino group is an amino group not having hydrogen at the $\alpha$-position. Specific examples thereof include an unsubstituted amino group and an amino group substituted by a tertiary alkyl group, an aryl group or a heterocyclic group. Among these, preferred are an arylamino group, a diarylamino group, a heterylamino group and an arylheterylamino group.

When the auxochrome is an ether group, the ether group is an ether group not having hydrogen at the $\alpha$-position. Specific examples thereof include an aryloxy group and a heteryloxy group, with an aryloxy group being preferred.

In the case where the dye is a water-soluble dye, the dye preferably further has an ionic hydrophilic group as a substituent. Examples of the ionic hydrophilic group as a substituent include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in the form of a salt and examples of the counter ion for forming the salt include ammonium ion, alkali metal ion (e.g., lithium ion, sodium ion, potassium ion) and organic cation (e.g., tetramethylammonium ion, tetramethylguanidinium ion, tetramethylphosphonium).

A and B each may have a substituent as long as the conditions (a) to (c) are satisfied, and specific examples thereof include an azo group, a halogen atom, an alkyl group (including a cycloalkyl group), an alkenyl group (including a cycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphono group, a phosphinyl group, a phosphinyloxy group, a phosphinylamino group and a silyl group. Among these, preferred are a halogen atom, a heterocyclic group, a cyano group, a nitro group, a carboxyl group, an acyloxy group, a carbamoyloxy group, an alkoxycarbonyloxy group, an aryloxycarbonyloxy group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an imido group, a phosphoryl group, a phosphono group, a phosphinoyl group, a phosphonyl group, a phosphinoyloxy group, a phosphinoylamino group. In the case where the substituent is an azo group, the dye of formula (1) represents a disazo dye, a trisazo dye or the like and this dye is preferred as a black dye.

In particular, the substituent is preferably an electron-withdrawing group, more preferably a substituent having a σp value of 0.40 or more. Examples of the substituent having a σp value of 0.40 or more include a cyano group, a nitro group, a carboxyl group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an imido group, a phosphono group, a phosphoryl group, an electron-withdrawing group-substituted alkyl group (e.g., trihalomethyl group, perfluoroalkyl group, dicyanomethyl group, iminomethyl group), an electron-withdrawing group-substituted alkenyl group (e.g., tricyanovinyl group) and a quaternary salt substituent (e.g., sulfonium group, ammonium group, phosphonium group). Among these functional group, those having a hydrogen atom may be substituted by the above-described group after eliminating the hydrogen atom. Examples of such a substituent include an alkylcarbonylaminosulfonyl group, an arylcarbonylaminosulfonyl group, an alkylsulfonylaminocarbonyl group and an arylsulfonylaminocarbonyl group.

The substituents on the heterocyclic ring may combine with each other to form a condensed ring with the heterocyclic ring and the condensed ring may have a substituent thereon.

In the present invention, an electron-withdrawing group is preferably introduced into the dye skeleton to render the oxidation potential nobler so as to reduce the reactivity with ozone which is an electrophilic agent. The oxidation potential of the dye is preferably 1.0 V or more. When this is described using a Hammett's substituent constant σp value as a measure for the electron withdrawing or donating property of the substituent, the reactivity with ozone can be decreased by introducing a substituent having a large σp value, such as nitro group, cyano group, sulfinyl group, sulfonyl group and sulfamoyl group.

The Hammett's substituent constant σp value is briefly described. The Hammett's rule is a rule of thumb advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96-103, Nankodo (1979).

In addition to the above-described substituent, when a larger number of atoms having a high electron negativity are contained as a constituent atom of the chromophore, the reactivity with ozone can be generally more decreased.

Accordingly, the reactivity with ozone can be more decreased by using, for example, an unsaturated heterocyclic ring than an aryl group as a constituent element of the chromophore.

Examples of the heteroatom having a high electron negativity include a nitrogen atom, an oxygen atom and a sulfur atom. Among these, a nitrogen atom is preferred.

Therefore, the azo dye for use in the present invention is preferably a dye where the chromophore is constituted by a heteroatom or contains an unsaturated heterocyclic ring or an electron-withdrawing group.

The electron-withdrawing substituent is preferably a substituent having a Hammett's σp value of 0.4 or more, more preferably 0.45 or more, and most preferably 0.50 or more. In the case where a plurality of electron-withdrawing groups are present as the substituent on the chromophore, the sum total of σp values of the substituents is preferably 0.50 or more, more preferably 0.60 or more, and most preferably 0.70 or more. Specific examples of the electron-withdrawing group having a σp value of 0.40 or more include those described in J. A. Dean (compiler), *Lange's Handbook of Chemistry*, 12th ed., McGraw-Hill (1979), and *Kagakuno Ryoiki* (*Chemistry Region*), special number, No. 122, pp. 96-103, Nankodo (1979).

As long as formula (1) is satisfied, the dye can be used in the present invention irrespective of the color of the dye. The azo dye of the present invention is particularly useful and preferably used as a magenta dye, a black dye or a yellow dye. The black dye is preferably a disazo dye or a trisazo dye.

In the case of using the present invention for the formation of a full color image, the image is formed using an ink set comprising, as minimum constituent elements, at least one yellow ink containing a yellow dye, at least one magenta ink containing a magenta dye and at least one cyan ink containing a cyan dye. At least one of the azo dyes used is preferably the azo dye represented by formula (1) and at least a yellow or magenta color ink preferably contains the azo dye represented by formula (1). More preferably, all azo dyes used are the dye of formula (1). In addition, the black dye is also preferably the azo dye of formula (1) but this dye may be a self-dispersing carbon black described in JP-A-2001-89688 (the term "JP-A" as used herein means an "unexamined published Japanese patent application").

In general, a phthalocyanine dye is preferably used as the cyan dye but in view of balance of discoloration with the azo dye of the present invention, a cyan dye represented by the following formula (3) is preferred.

Formula (3)

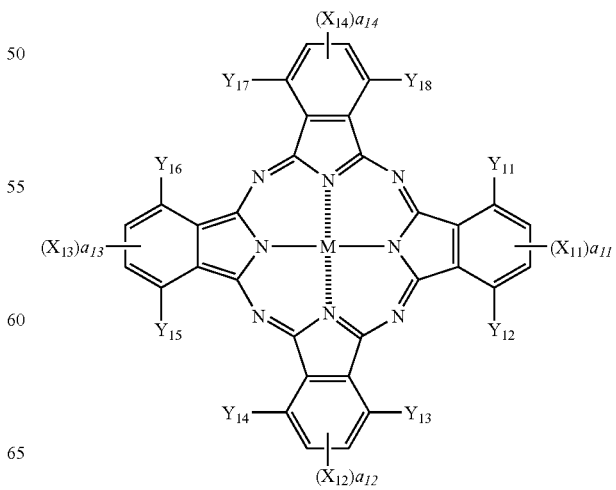

wherein $X_{11}$ to $X_{14}$ each independently represents an electron-withdrawing group having a σp value of 0.40 or more, $Y_{11}$ to $Y_{18}$ each independently represents a monovalent substituent, preferably a hydrogen atom, M represents a hydrogen atom, a metal element or its oxide, hydroxide or halide, and $a_{11}$ to $a_{14}$ each independently represents an integer of 1 or 2.

When the dye is a water-soluble dye, an ionic hydrophilic group is preferably further present as a substituent at any position on $X_{11}$ to $X_{14}$ or on $Y_{11}$ to $Y_{18}$. Examples of the ionic hydrophilic group as a substituent include those described above.

Preferred examples of the dye which can be used in the present invention are set forth below, however, these are shown only for describing the present invention in detail and the present invention is not limited thereto.

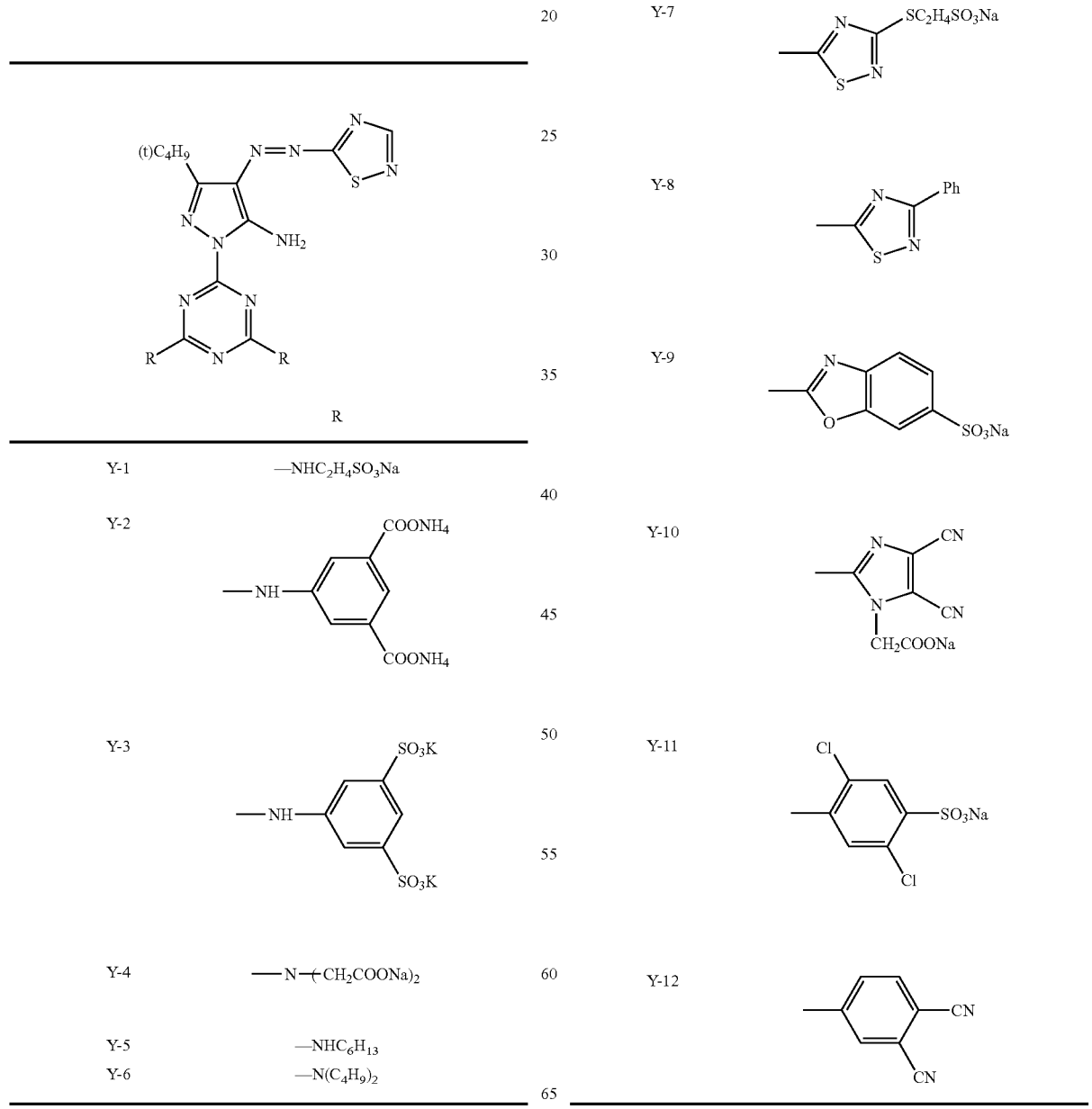

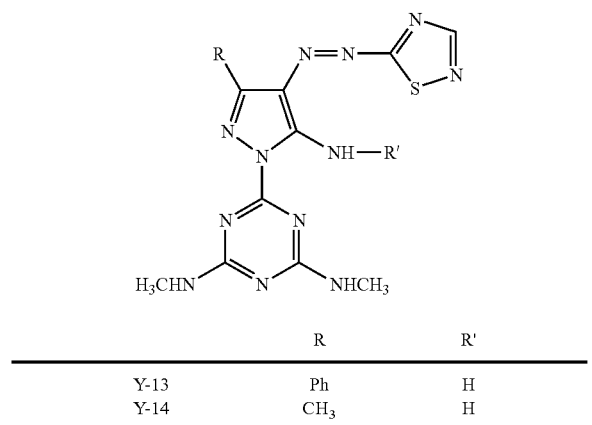
| | R | R' |
|---|---|---|
| Y-13 | Ph | H |
| Y-14 | CH₃ | H |
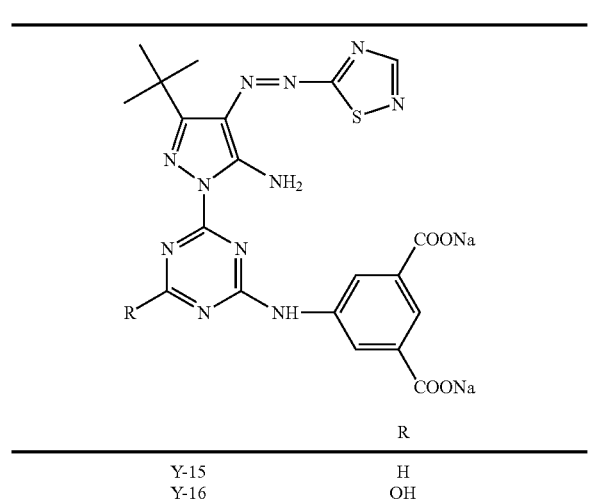
| | R |
|---|---|
| Y-15 | H |
| Y-16 | OH |
| Y-17 | SO₃Na |
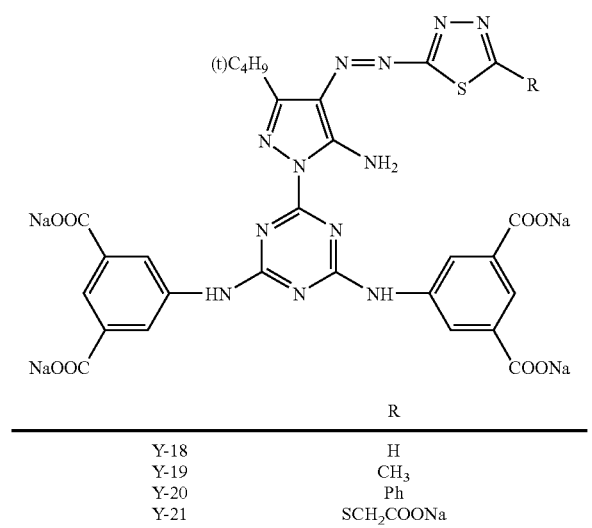
| | R |
|---|---|
| Y-18 | H |
| Y-19 | CH₃ |
| Y-20 | Ph |
| Y-21 | SCH₂COONa |
-continued
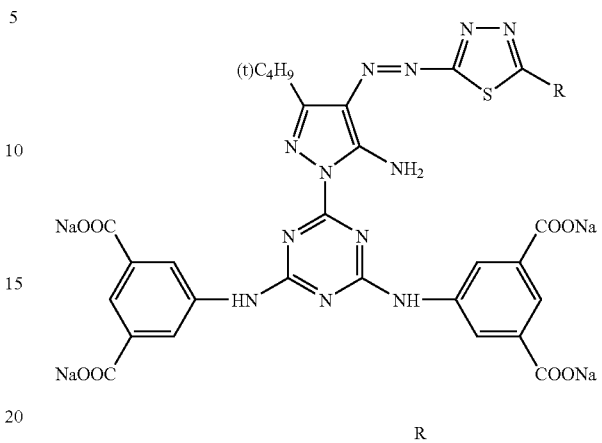
| | R |
|---|---|
| Y-22 | SCH₂CHMe₂ |
| Y-23 | SC₂H₄OC₂H₅ |
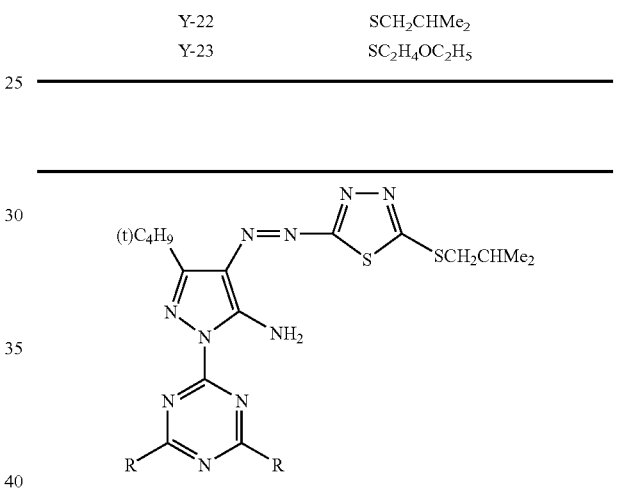
| | R |
|---|---|
| Y-24 | —NHC₂H₄COOK |
| Y-25 | 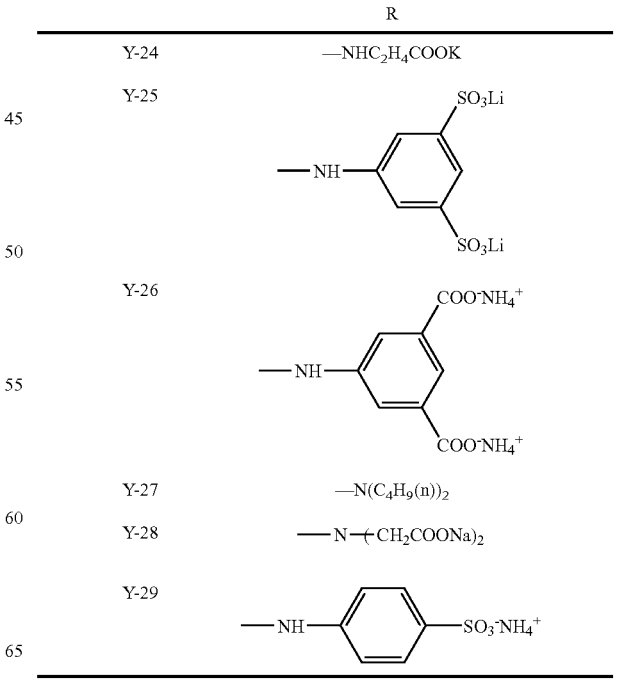 |
| Y-26 | |
| Y-27 | —N(C₄H₉(n))₂ |
| Y-28 | —N(CH₂COONa)₂ |
| Y-29 | |

Y-30 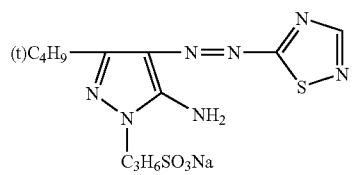
Y-31 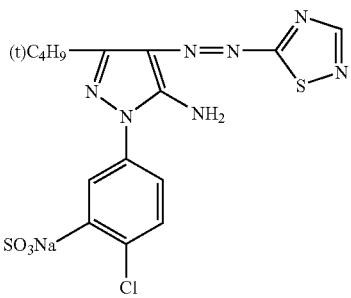
Y-32 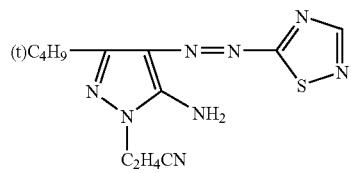
Y-33
Y-34 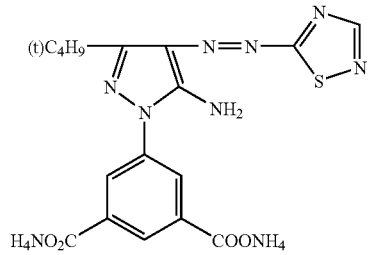
Y-35 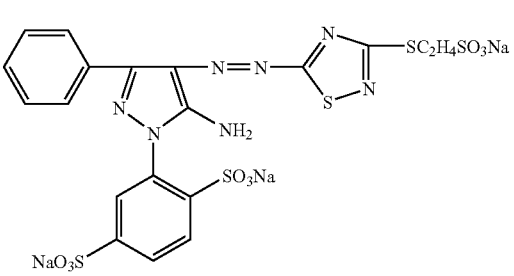
Y-36 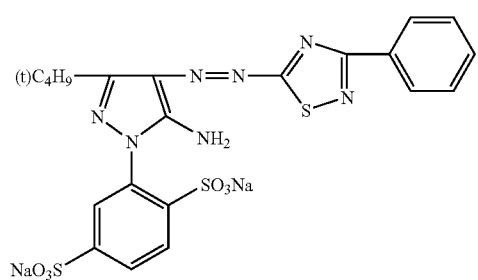
Y-37 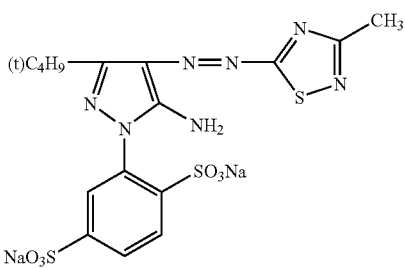
Y-38 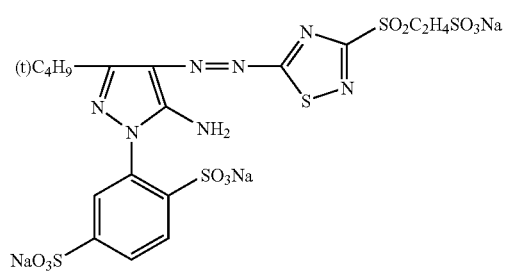
Y-39 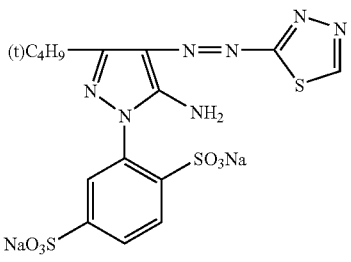
Y-40 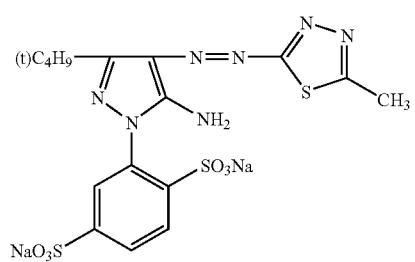
Y-41 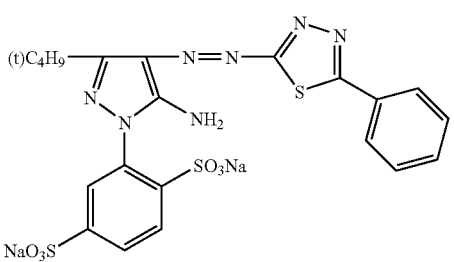

-continued
Y-42
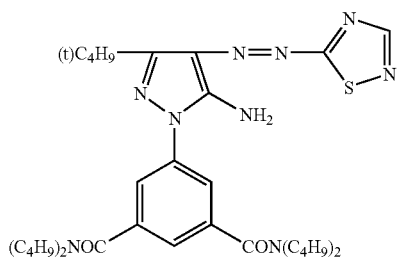
Y-43
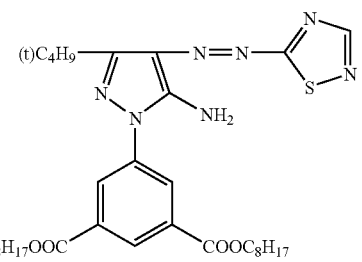
Y-44
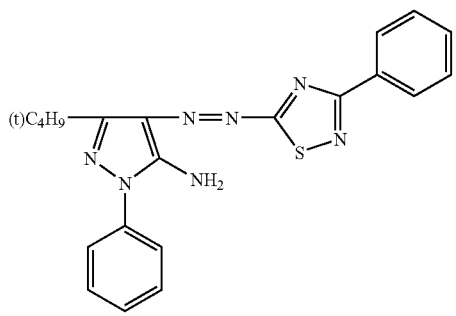
Y-45
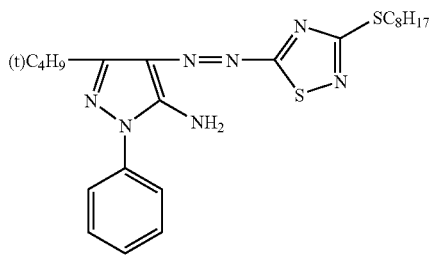
Y-46
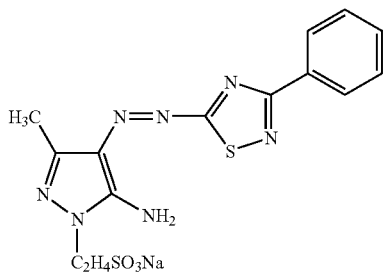
Y-47
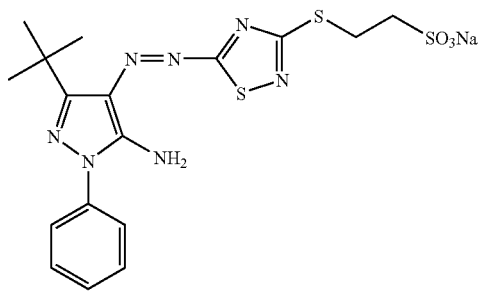
Y-48
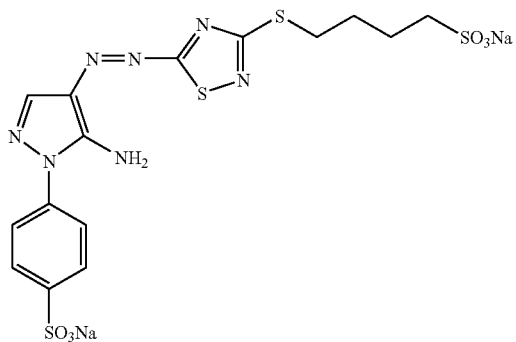
Y-49
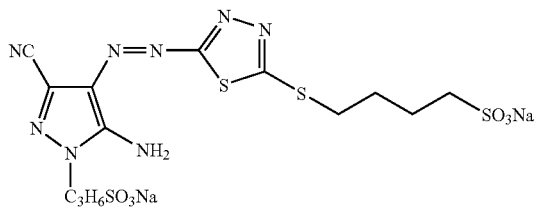
Y-50
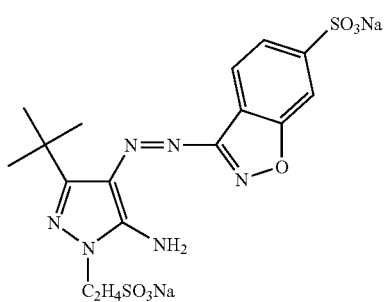
Y-51
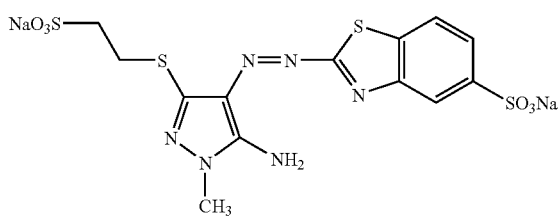

-continued
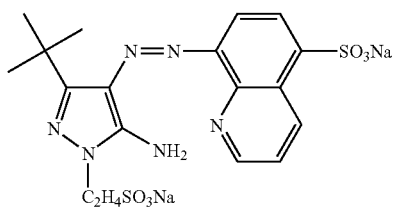
Y-52
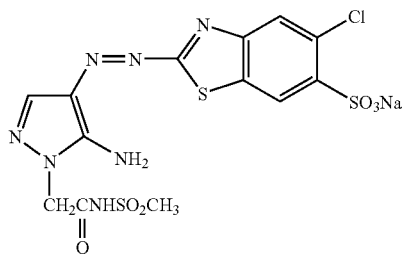
Y-53
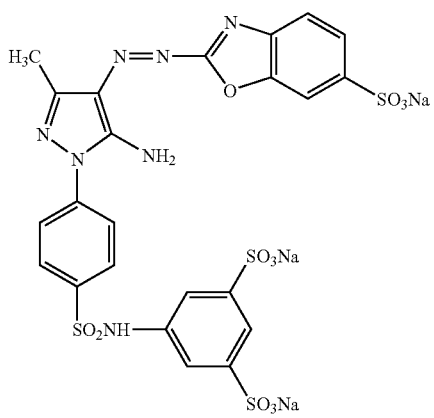
Y-54
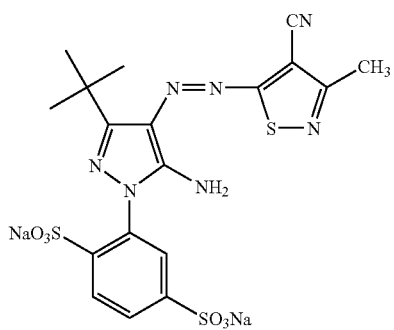
Y-55
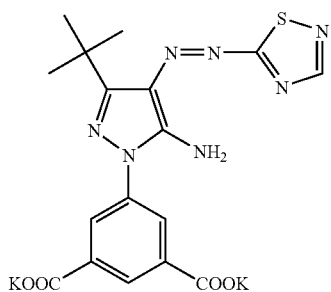
Y-56
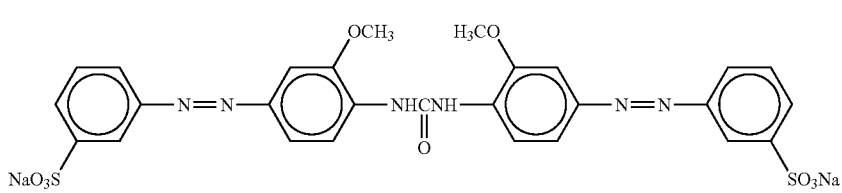
Y-57
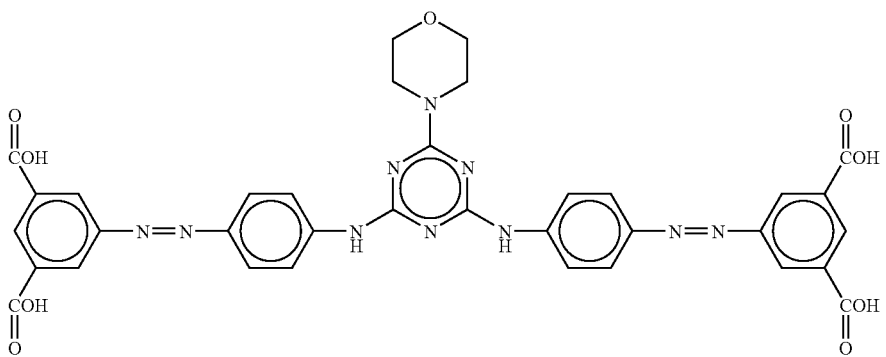
Y-58

-continued
Y-59
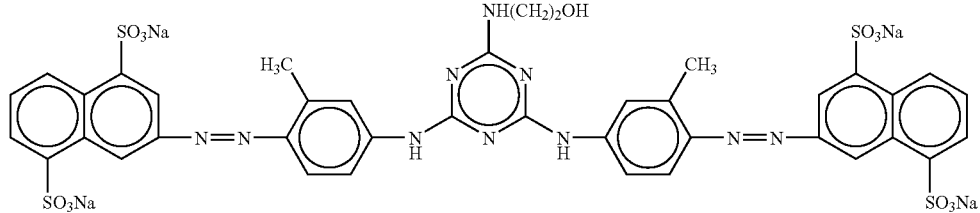
Y-60
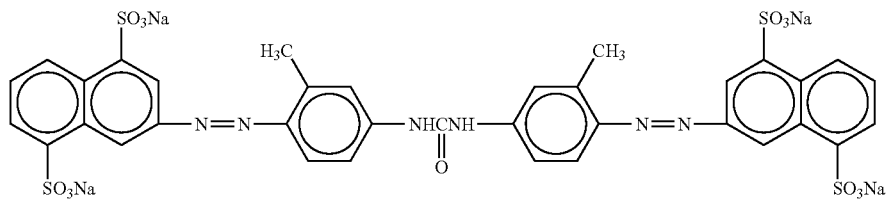
Y-61
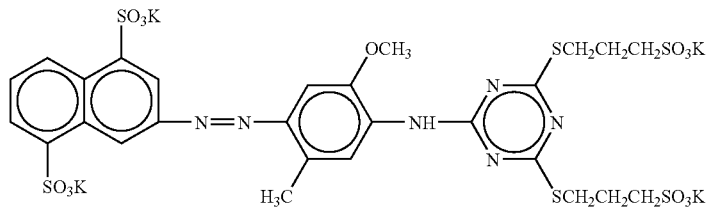
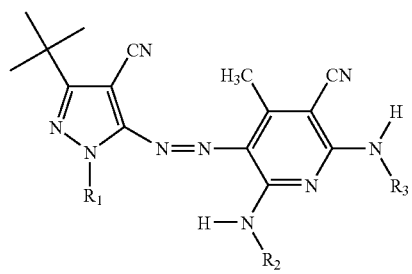
| | R₁ | R₂ | R₃ |
|---|---|---|---|
| M-1 | 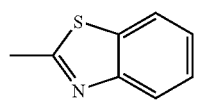 | 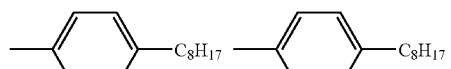 | |
| M-2 | 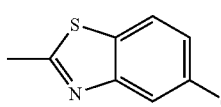 | 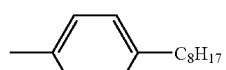 | 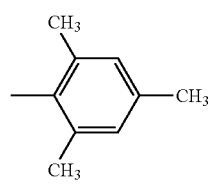 |
| M-3 | 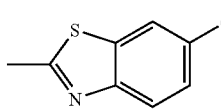 | 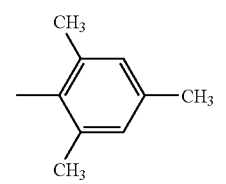 | 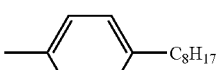 |

-continued
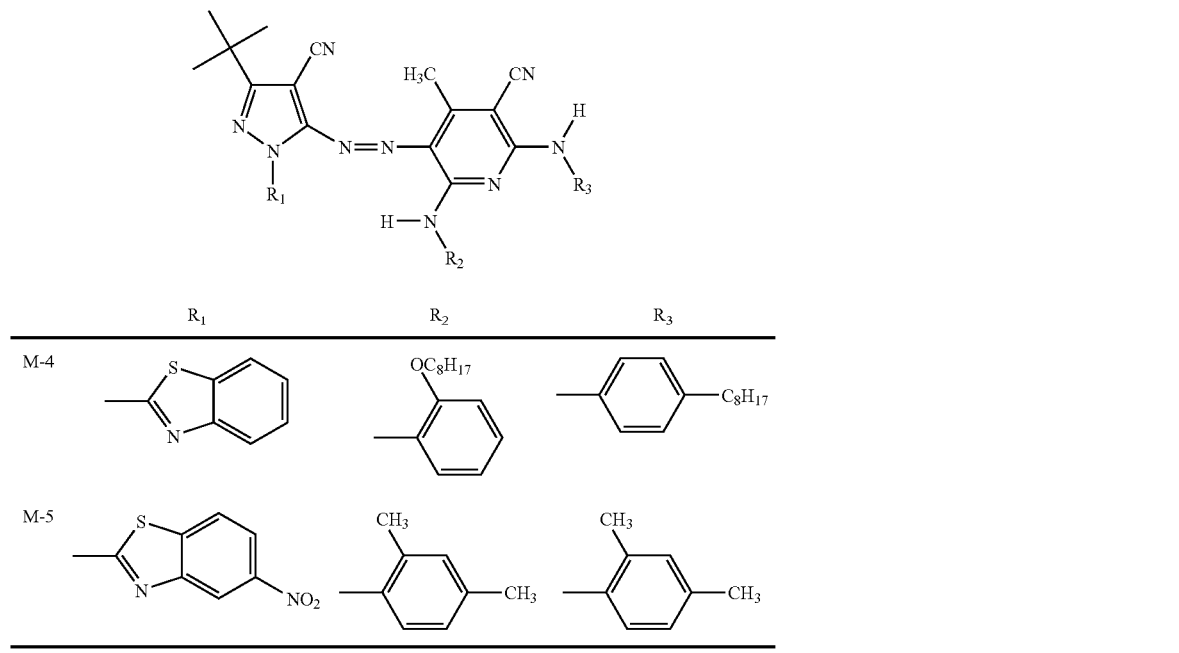
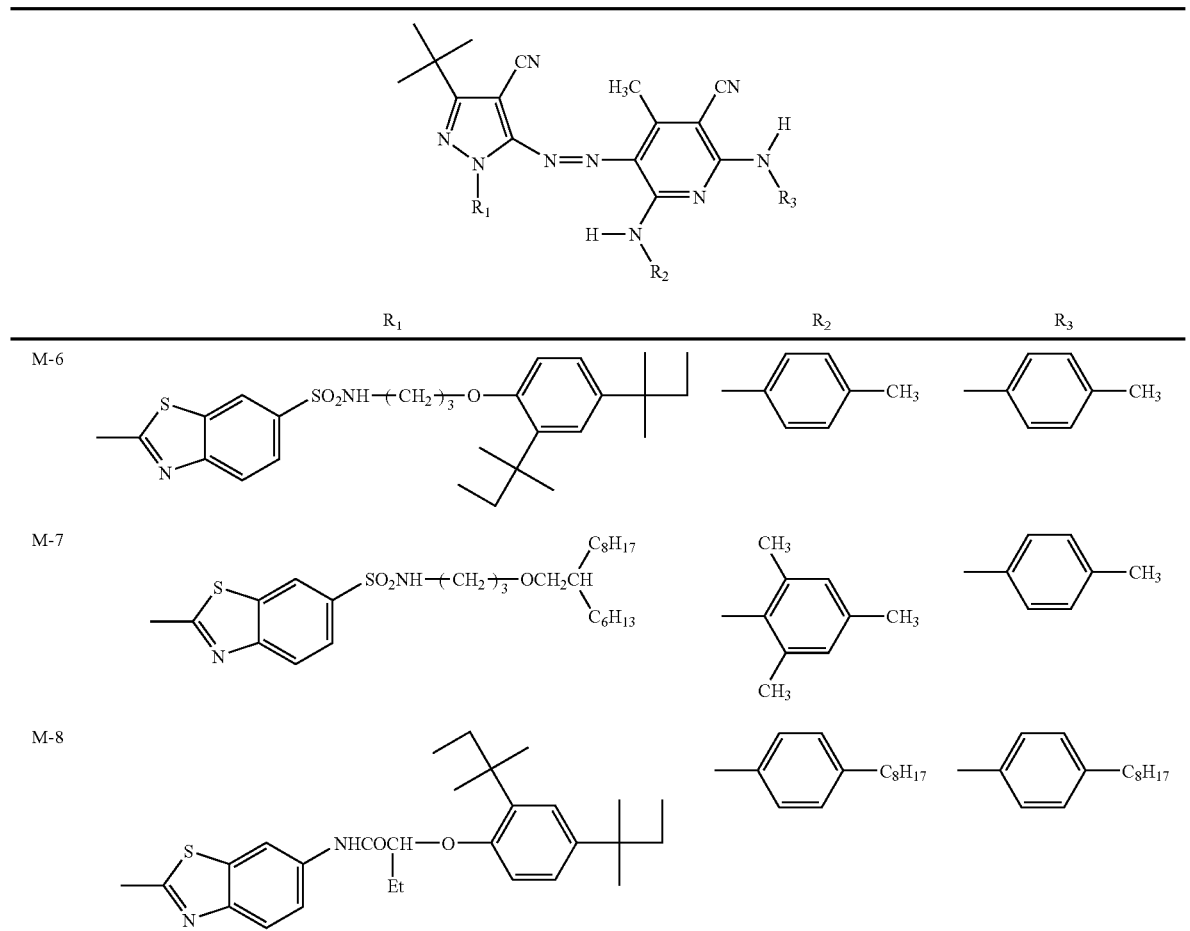

-continued
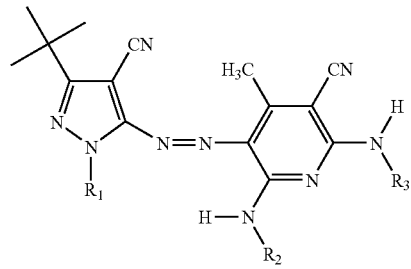
| | $R_1$ | $R_2$ | $R_3$ |
|---|---|---|---|
| M-9 | 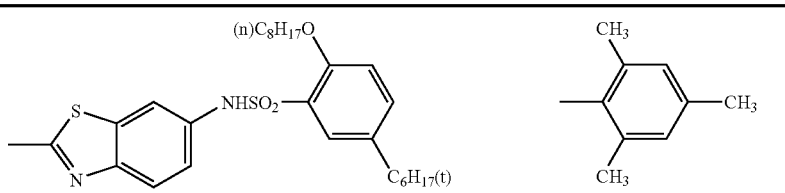 | | |
| M-10 |  | | |
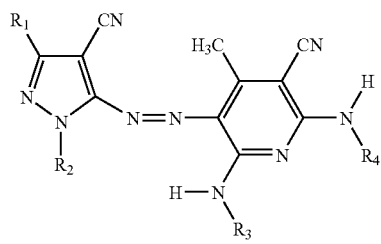
| | $R_1$ | $R_2$ | $R_3$ | $R_4$ |
|---|---|---|---|---|
| M-11 | 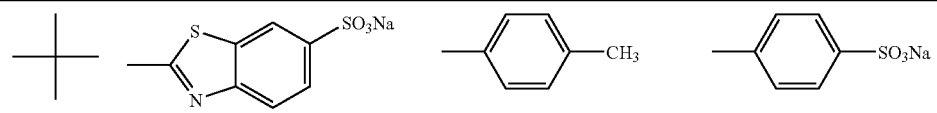 | | | |
| M-12 | 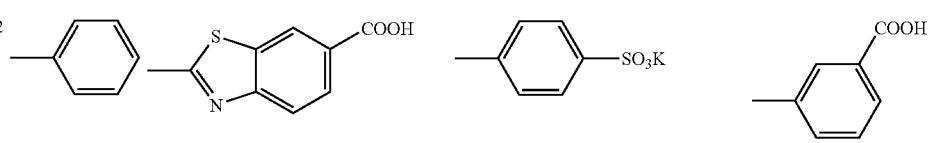 | | | |
| M-13 | 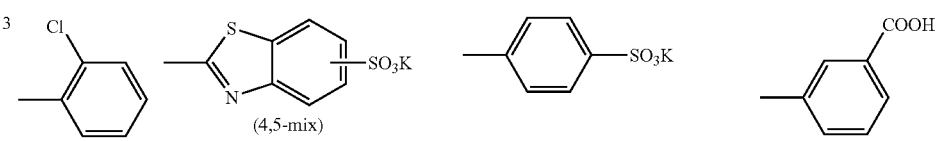 | | | |
| M-14 | 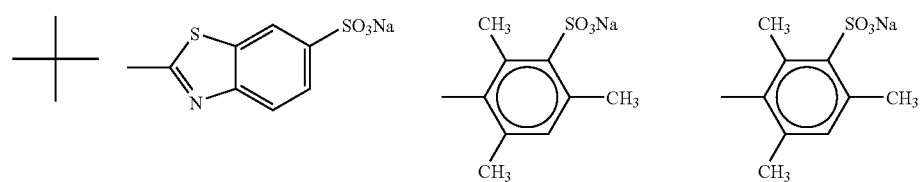 | | | |

-continued

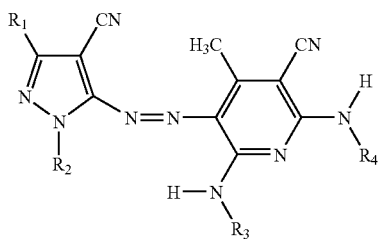

| | $R_1$ | $R_2$ | $R_3$ | $R_4$ |
|---|---|---|---|---|
| M-15 | t-Bu | 2-methylbenzothiazol-6-yl-SO₃K | 2,3,5,6-tetramethylphenyl-SO₃K | 2,3,5,6-tetramethylphenyl-SO₃K |
| M-16 | t-Bu | 6-chloro-2-methylbenzothiazolyl | 2,3,5-trimethyl-4-(CH₂N(CH₂CO₂H)₂)phenyl | 2,3,5-trimethyl-4-(CH₂N(CH₂CO₂H)₂)phenyl |
| M-17 | t-Bu | 2-methylbenzothiazol-6-yl-SO₃Na | 2,3,5-trimethyl-4-SO₃Na-phenyl | 2,3,5-trimethyl-4-SO₃Na-phenyl |

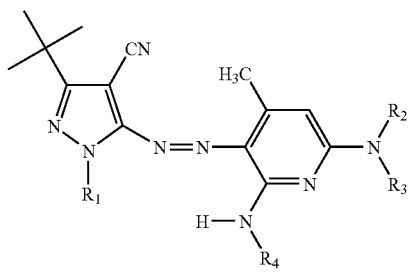

| | $R_1$ | $R_2$ | $R_3$ | $R_4$ |
|---|---|---|---|---|
| M-18 | 2-benzothiazolyl | 2-benzothiazolyl | mesityl-CH₃ | mesityl |
| M-19 | 5-chloro-2-methylbenzothiazolyl | —SO₂CH₃ | mesityl | 4-methylphenyl |

-continued
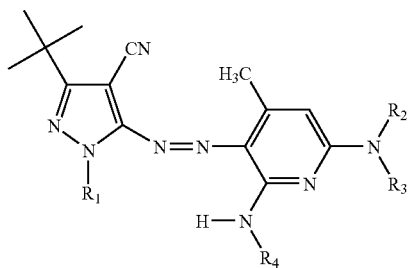
|  | R₁ | R₂ | R₃ | R₄ |
|---|---|---|---|---|
| M-20 | 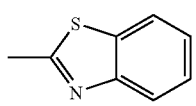 | —COCH₃ | $C_8H_{17}(t)$ | $C_8H_{17}(t)$ |
| M-21 | 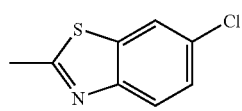 | —SO₂CH₃ | 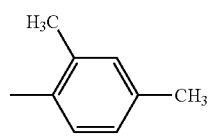 | $C_8H_{17}(t)$ |
| M-22 | 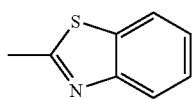 | H | 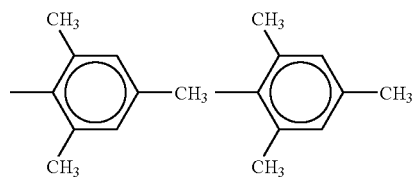 | |
| M-23 | 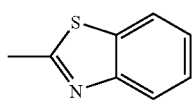 | H | 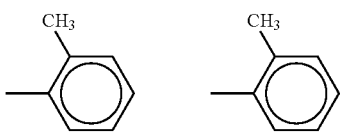 | |
| M-24 | 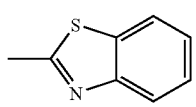 | H | 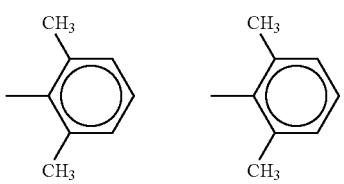 | |
| M-25 | 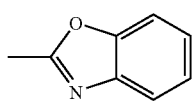 | 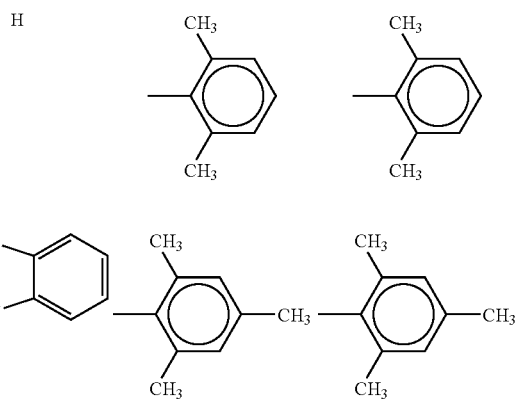 | | |

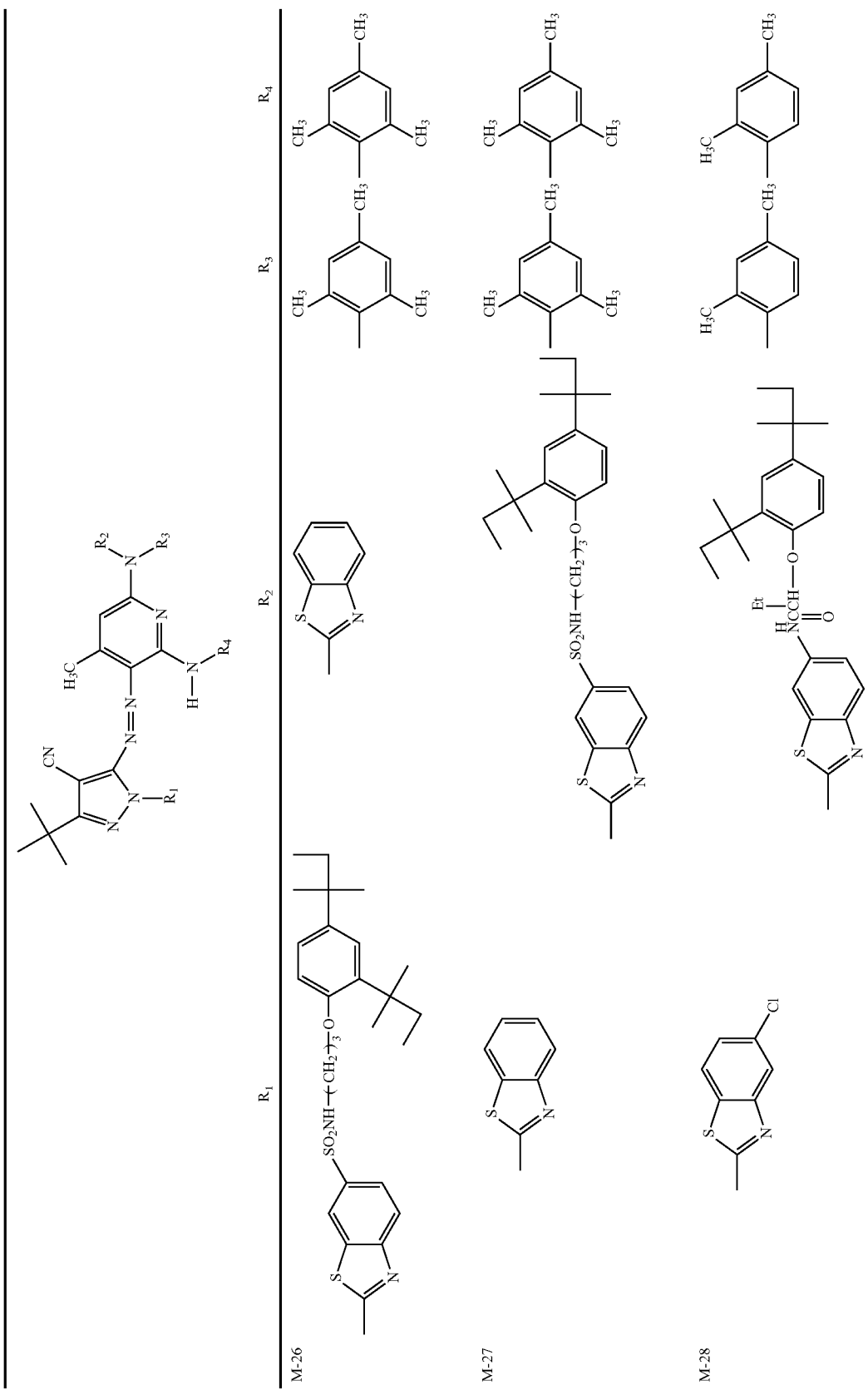

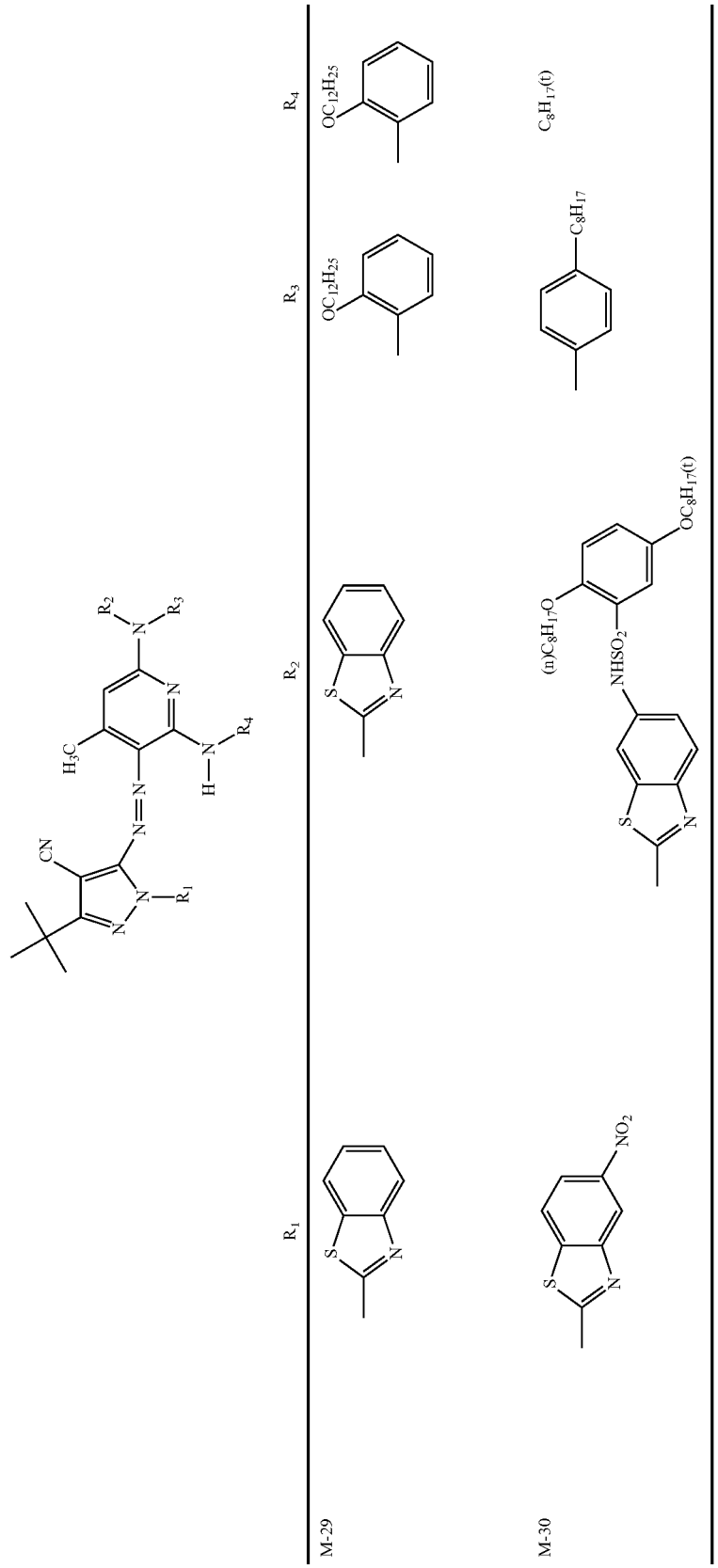

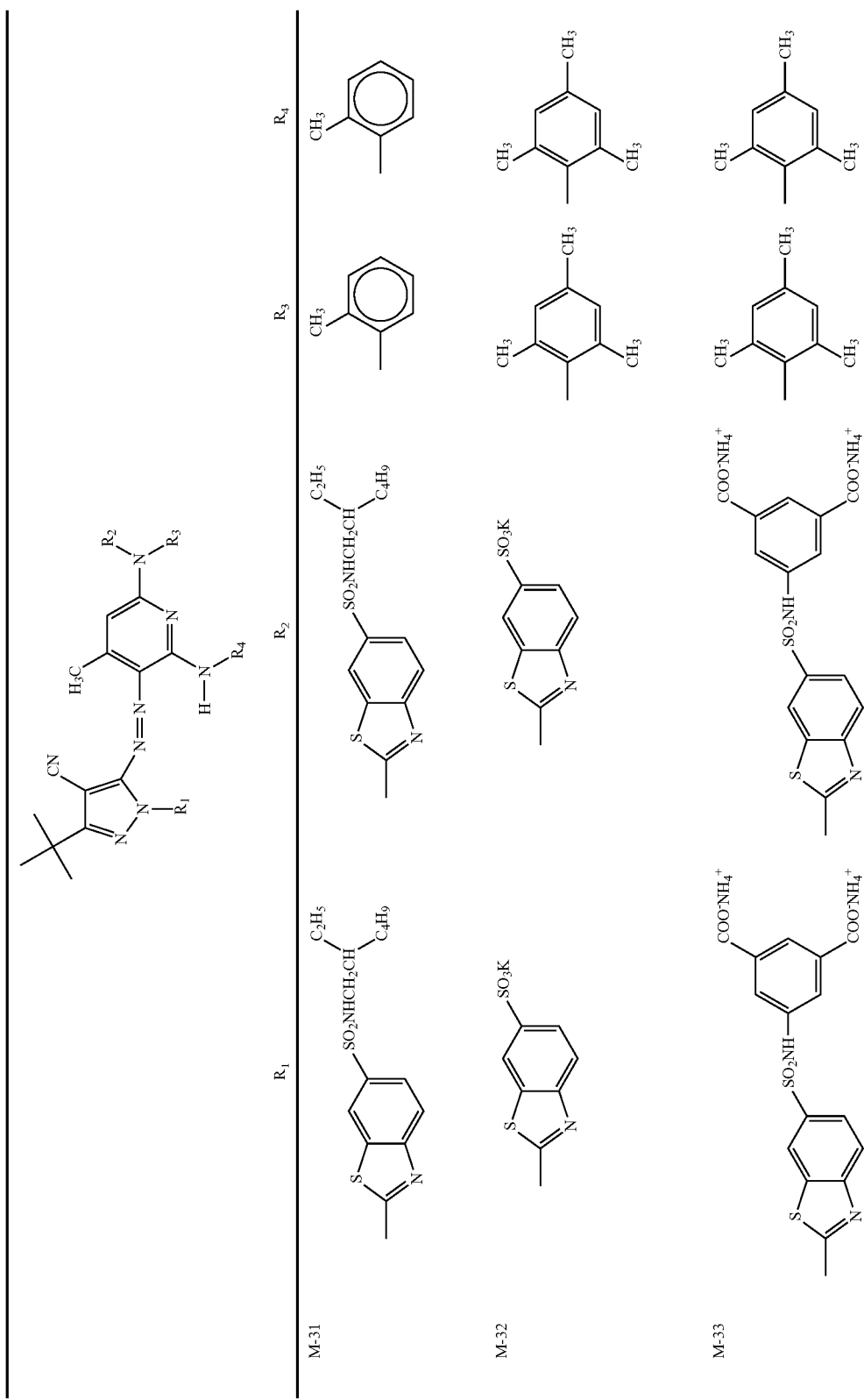

| | $R_1$ | $R_2$ | $R_3$ | $R_4$ |
|---|---|---|---|---|
| M-34 | 3,5-bis(COOH)-phenyl-SO₂NH-benzothiazol-2-yl (5,6-mix) | 3,5-bis(COOH)-phenyl-SO₂NH-benzothiazol-2-yl (5,6-mix) | 2,4,6-trimethylphenyl | 2,4,6-trimethylphenyl |
| M-35 | 2-methylbenzothiazol-SO₃Na (5,6-mix) | 3,5-bis(COOH)-phenyl-SO₂NH-benzothiazol-2-yl (5,6-mix) | 4-methylphenyl | 2,6-dimethylphenyl |

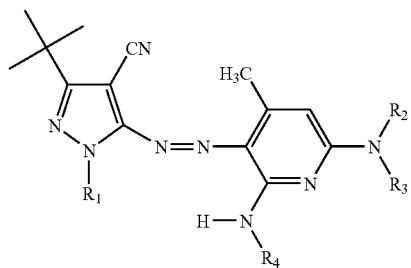
| | $R_1$ | $R_2$ | $R_3$ | $R_4$ |
|---|---|---|---|---|
| M-36 | 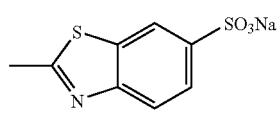 | 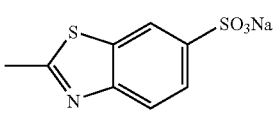 | 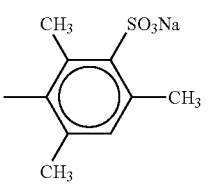 | 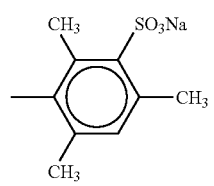 |
| M-37 | 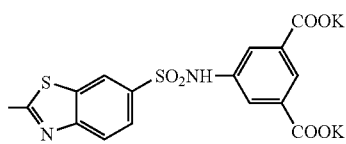 | 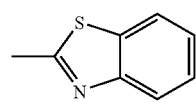 | 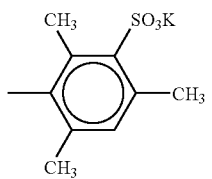 | 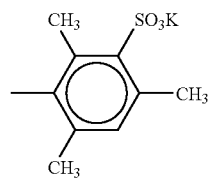 |
| M-38 | 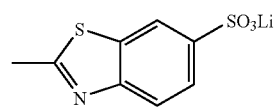 | 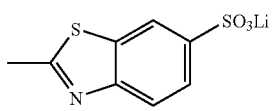 | 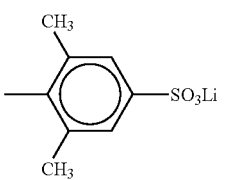 | 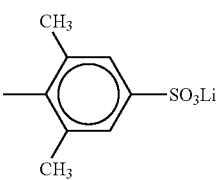 |
| M-39 | 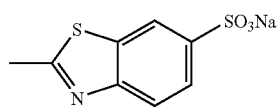 | 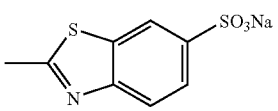 | 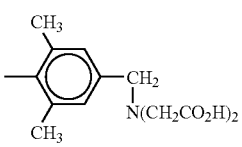 | 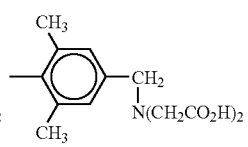 |
| M-40 | 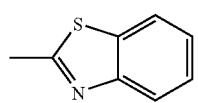 | 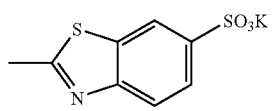 | 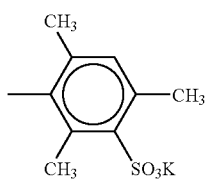 | 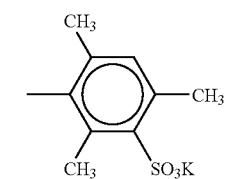 |

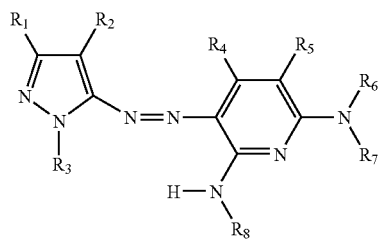

| | $R_1$ | $R_2$ | $R_3$ | $R_4$ | $R_5$ | $R_6$ | $R_7$ | $R_8$ |
|---|---|---|---|---|---|---|---|---|
| M-41 | CH$_3$-(2-methylphenyl) | CN | 2-pyridyl | H | CONH$_2$ | SO$_2$CH$_3$ | 2-OC$_8$H$_17$-phenyl | 2-methylphenyl |
| M-42 | t-Bu | Br | 2-pyrimidyl | COOEt | H | 2-benzothiazolyl | C$_8$H$_{17}$(t) | COCH$_3$ |
| M-43 | 2-pyridyl | SO$_2$CH$_3$ | 4-methyl-2,6-bis(NHCH$_3$)-1,3,5-triazinyl | CONH$_2$ | H | 6-chloro-2-benzothiazolyl | 4-methylphenyl | COC(CH$_3$)$_3$ |
| M-44 | t-Bu | CN | 2,4,5-tricyano-methylphenyl | H | H | 2-benzothiazolyl | 4-chloro-2-methylphenyl | SO$_2$CH$_3$ |
| M-45 | t-Bu | Br | 3,5-dichloro-4-methyl-nitrophenyl | H | CONH$_2$ | COCH$_3$ | 2,4,6-trimethylphenyl | 4-C$_8$H$_{17}$-phenyl |
| M-46 | t-Bu | CN | 2-benzothiazolyl | CH$_3$ | H | 2-benzothiazolyl | 2,6-diethyl-4-methylphenyl | 2,6-diethyl-4-methylphenyl |

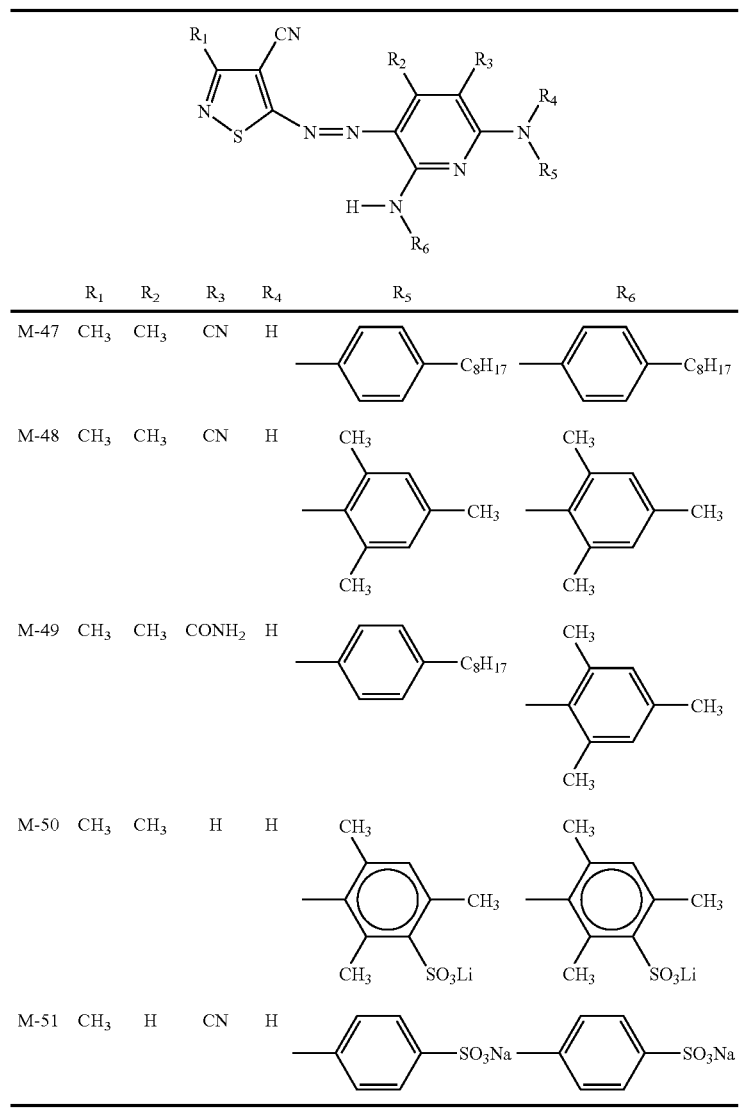

| | $R_1$ | $R_2$ | $R_3$ | $R_4$ | $R_5$ | $R_6$ |
|---|---|---|---|---|---|---|
| M-47 | $CH_3$ | $CH_3$ | CN | H | —C$_6$H$_4$—C$_8$H$_{17}$ | —C$_6$H$_4$—C$_8$H$_{17}$ |
| M-48 | $CH_3$ | $CH_3$ | CN | H | 2,4,5-tri(CH$_3$)phenyl | 2,4,6-tri(CH$_3$)phenyl |
| M-49 | $CH_3$ | $CH_3$ | $CONH_2$ | H | —C$_6$H$_4$—C$_8$H$_{17}$ | 2,4,6-tri(CH$_3$)phenyl |
| M-50 | $CH_3$ | $CH_3$ | H | H | 2,3,5-tri(CH$_3$)-6-SO$_3$Li-phenyl | 2,3,5-tri(CH$_3$)-6-SO$_3$Li-phenyl |
| M-51 | $CH_3$ | H | CN | H | —C$_6$H$_4$—SO$_3$Na | —C$_6$H$_4$—SO$_3$Na |

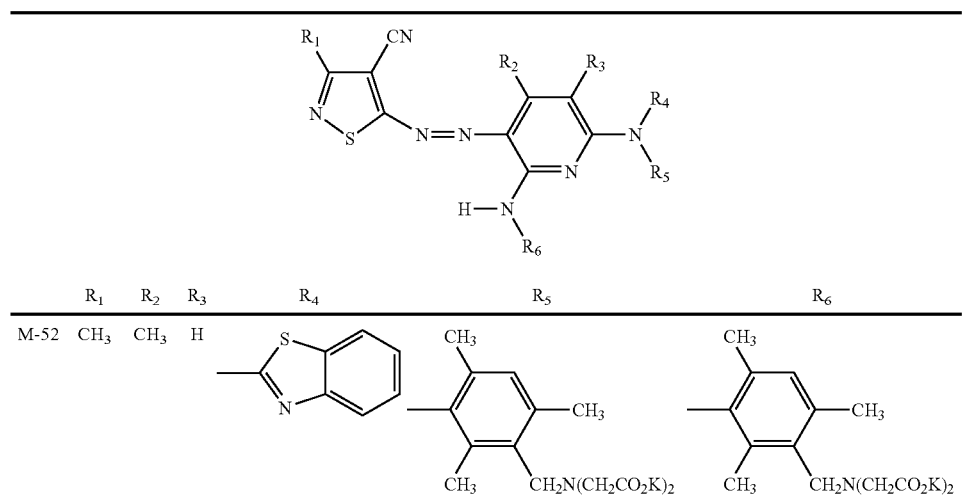

| | $R_1$ | $R_2$ | $R_3$ | $R_4$ | $R_5$ | $R_6$ |
|---|---|---|---|---|---|---|
| M-52 | $CH_3$ | $CH_3$ | H | 2-benzothiazolyl | 2,3,5-tri(CH$_3$)-6-CH$_2$N(CH$_2$CO$_2$K)$_2$-phenyl | 2,3,5-tri(CH$_3$)-6-CH$_2$N(CH$_2$CO$_2$K)$_2$-phenyl |

-continued
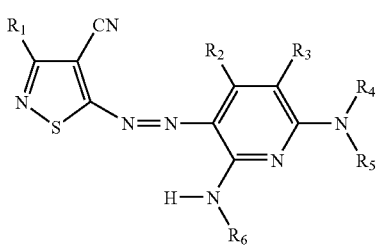
| | R₁ | R₂ | R₃ | R₄ | R₅ | R₆ |
|---|---|---|---|---|---|---|
| M-53 | CH₃ | CH₃ | H | 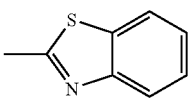 | 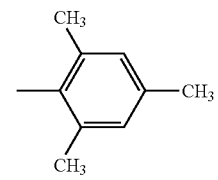 | 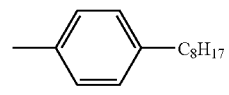 |
| M-54 | CH₃ | H | H | SO₂CH₃ | 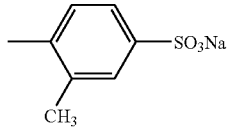 | 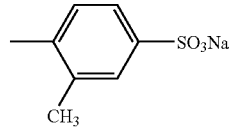 |
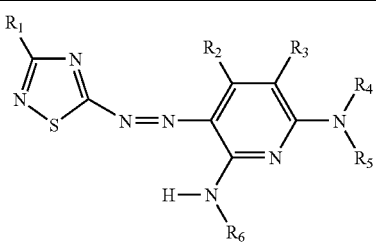
| | R₁ | R₂ | R₃ | R₄ | R₅ | R₆ |
|---|---|---|---|---|---|---|
| M-55 | —SCH₃ | CH₃ | CN | H | (C₈H₁₇(t) | 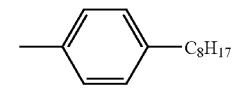 |
| M-56 | 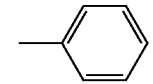 | H | CONH₂ | H | 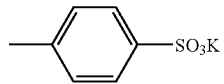 | 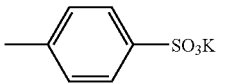 |
| M-57 | 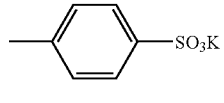 —S—CH₂—SO₃K | CH₃ | H | 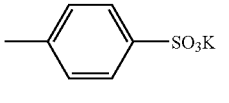 | 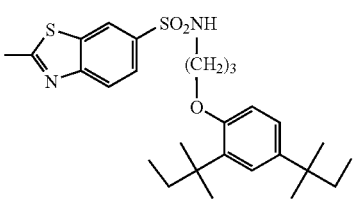 | 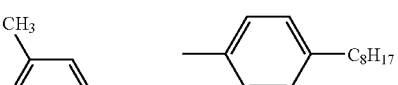 |
| M-58 | —CH₃ | CH₃ | H | | | |

-continued
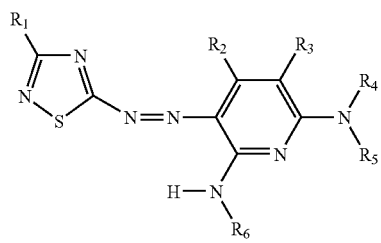
| | R₁ | R₂ | R₃ | R₄ | R₅ | R₆ |
|---|---|---|---|---|---|---|
| M-59 | (phenyl) | H | H | 2-methylbenzothiazol-6-yl NHSO₂-(2-OC₈H₁₇(n), 5-C₈H₁₇(t))phenyl | 2,4,6-trimethylphenyl | C₈H₁₇(t) |
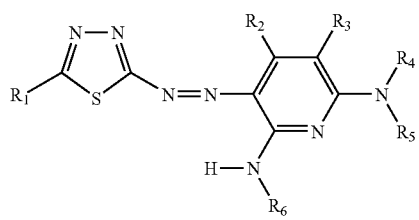
| | R₁ | R₂ | R₃ | R₄ | R₅ | R₆ |
|---|---|---|---|---|---|---|
| M-60 | Me | CH₃ | CN | H | 4-SO₃K-phenyl | 4-SO₃K-phenyl |
| M-61 | Me | CH₃ | CN | H | 3,5-(C₂H₅)₂-4-CH₃-phenyl | 3,5-(C₂H₅)₂-4-CH₃-phenyl |
| M-62 | Me | H | H | 2-methylbenzothiazolyl | 2,4,6-(CH₃)₃-3-SO₃K-phenyl | 2,4,6-(CH₃)₃-3-SO₃K-phenyl |
| M-63 | Ph | CH₃ | CONH₂ | H | 4-C₈H₁₇-phenyl | 4-C₈H₁₇-phenyl |

-continued

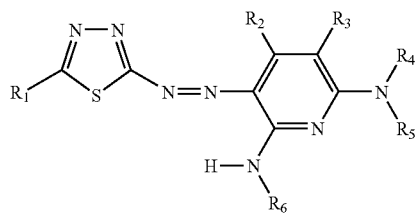

| | $R_1$ | $R_2$ | $R_3$ | $R_4$ | $R_5$ | $R_6$ |
|---|---|---|---|---|---|---|
| M-64 | Ph | CH$_3$ | H | (2-methylbenzothiazol-6-yl)SO$_2$NH(CH$_2$)$_3$O-(2,4-di-tert-pentylphenyl) | 4-(n-OC$_4$H$_9$)-phenyl | 2,6-di-C$_2$H$_5$-4-CH$_3$-phenyl |

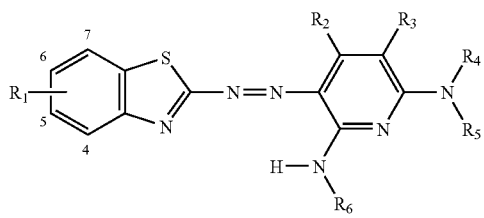

| | $R_1$ | $R_2$ | $R_3$ | $R_4$ | $R_5$ | $R_6$ |
|---|---|---|---|---|---|---|
| M-65 | 5-Cl | CH$_3$ | CONH$_2$ | H | C$_8$H$_{17}$(t) | C$_8$H$_{17}$(t) |
| M-66 | 5,6-diCl | H | H | 2-methylbenzothiazol-yl | 4-C$_8$H$_{17}$-phenyl | 4-C$_8$H$_{17}$-phenyl |
| M-67 | 5,5-diCl | CH$_3$ | H | 2-methylbenzothiazol-yl | 2,4,6-tri-CH$_3$-phenyl | COCH$_3$ |
| M-68 | 5-CH$_3$ | H | CN | H | 4-SO$_3$K-phenyl | 4-SO$_3$K-phenyl |
| M-69 | 5-NO$_2$ | CH$_3$ | H | SO$_2$CH$_3$ | 2,3-di-CH$_3$-phenyl | 2,4,6-tri-CH$_3$-phenyl |

-continued
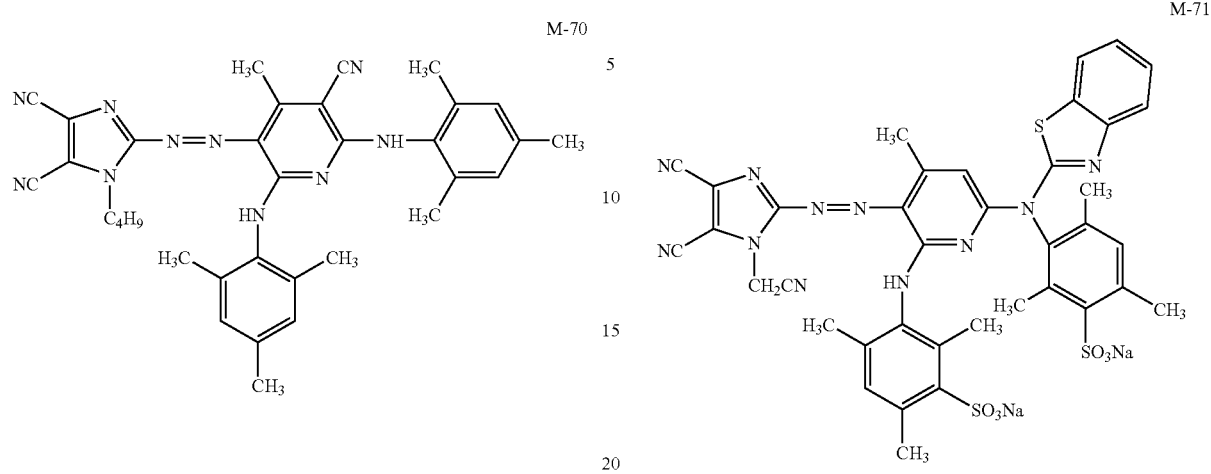
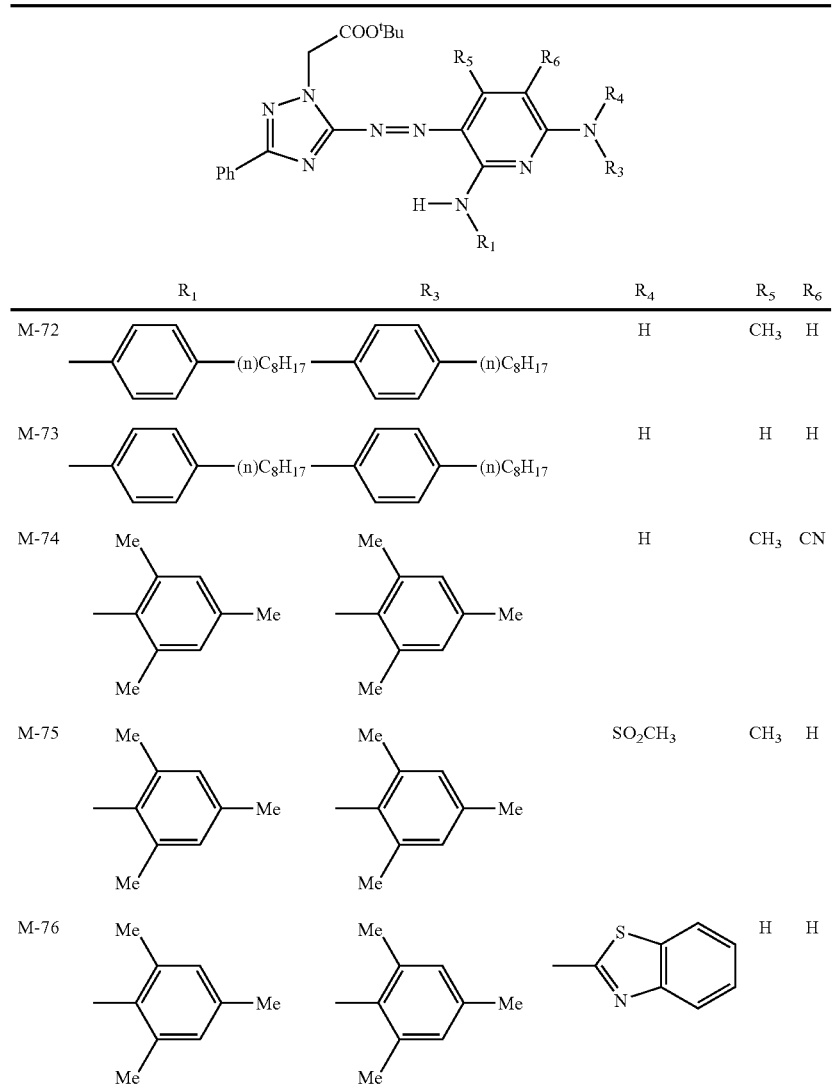
| | R₁ | R₃ | R₄ | R₅ | R₆ |
|---|---|---|---|---|---|
| M-72 | —C₆H₄—(n)C₈H₁₇ | —C₆H₄—(n)C₈H₁₇ | H | CH₃ | H |
| M-73 | —C₆H₄—(n)C₈H₁₇ | —C₆H₄—(n)C₈H₁₇ | H | H | H |
| M-74 | mesityl (Me,Me,Me-C₆H₂) | mesityl (Me,Me,Me-C₆H₂) | H | CH₃ | CN |
| M-75 | mesityl (Me,Me,Me-C₆H₂) | mesityl (Me,Me,Me-C₆H₂) | SO₂CH₃ | CH₃ | H |
| M-76 | mesityl (Me,Me,Me-C₆H₂) | mesityl (Me,Me,Me-C₆H₂) | 2-benzothiazolyl | H | H |

-continued
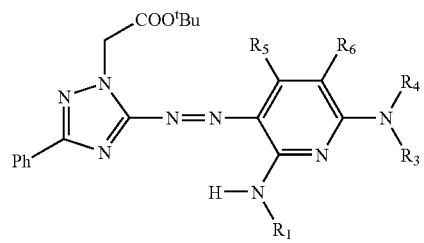
| | $R_1$ | $R_3$ | $R_4$ | $R_5$ | $R_6$ |
|---|---|---|---|---|---|
| M-77 | 2,4,6-trimethylphenyl | 2,4,6-trimethylphenyl | H | $CH_3$ | CN |
| M-78 | 4-($SO_3K$)phenyl | 4-($SO_3K$)phenyl | H | $CH_3$ | CN |
| M-79 | 2-($OC_{12}H_{25}$)phenyl | 2-($OC_{12}H_{25}$)phenyl | H | $CH_3$ | CN |
| M-80 | 3,5-di($COONH_4$)phenyl | 3,5-di($COONH_4$)phenyl | H | $CH_3$ | CN |
$$A-N=N-B-N=N-C$$
| | A | B | C |
|---|---|---|---|
| (BK-1) | phenyl | 2,5-dimethyl-3-cyano-thiophene | 4-methyl-3-cyano-2,6-bis(sulfophenylamino)pyridine, di-Li salt |

-continued
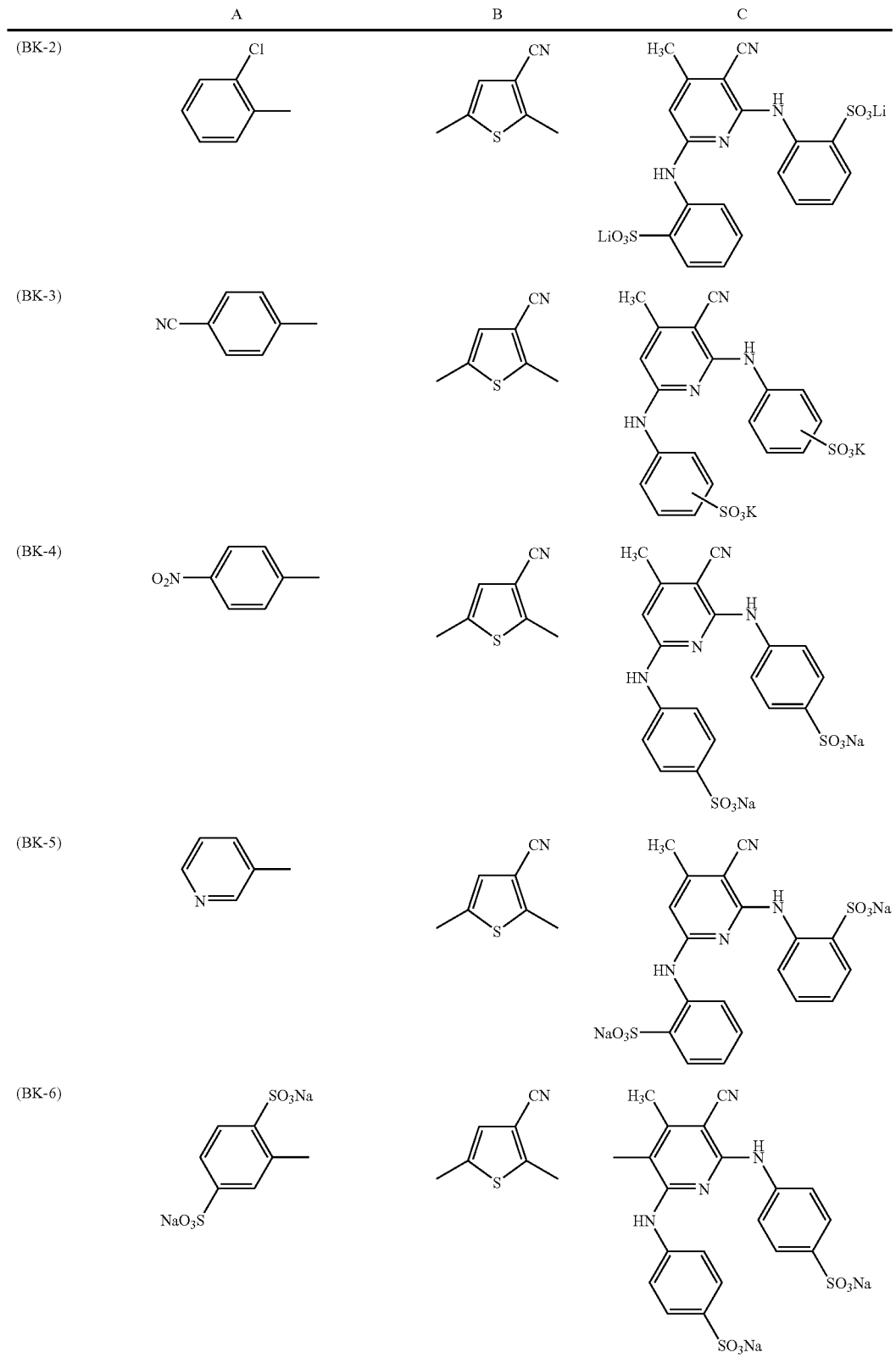

-continued
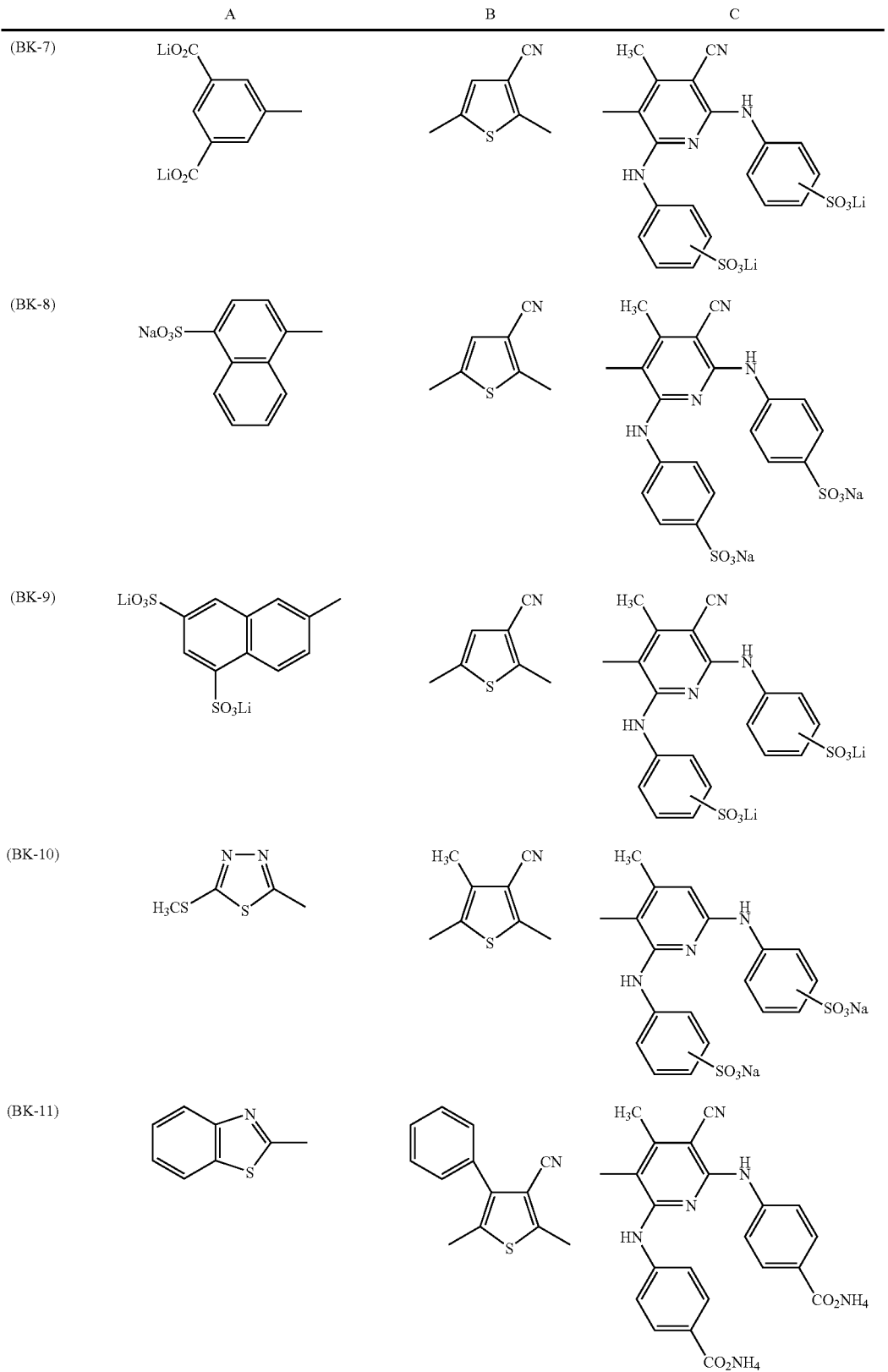

-continued
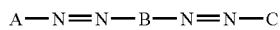
| A | B | C |
|---|---|---|
(BK-12)
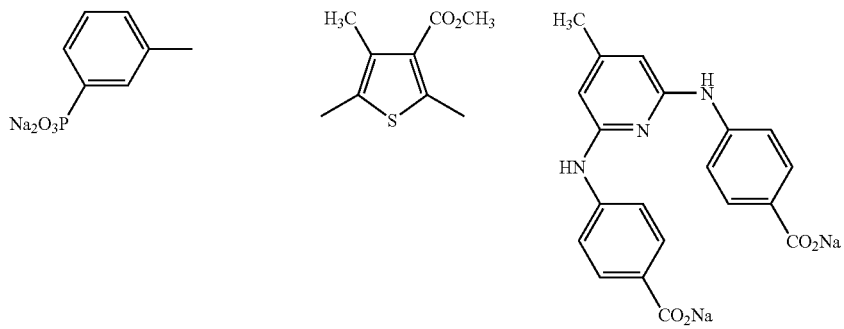
(BK-13)
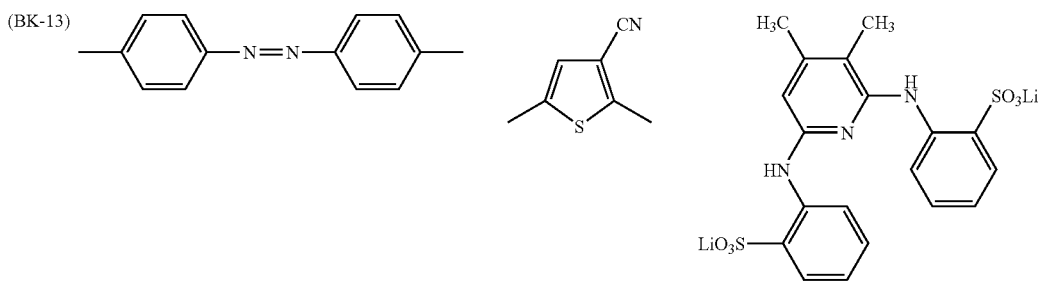
(BK-14)
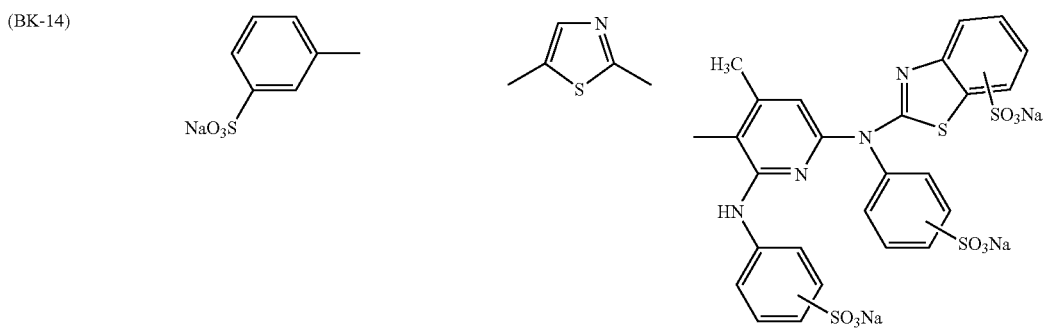
(BK-15)
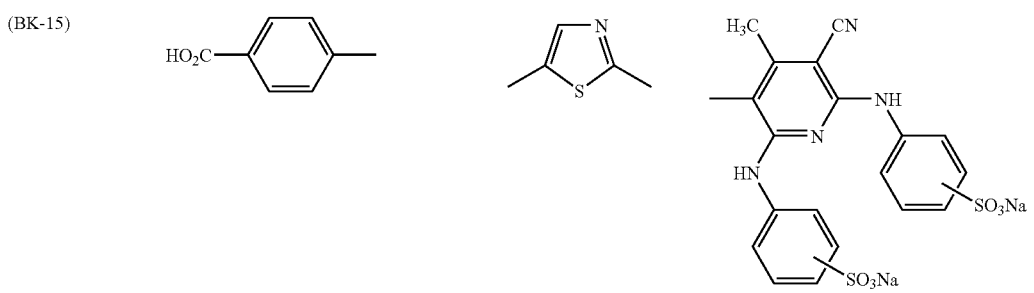

-continued
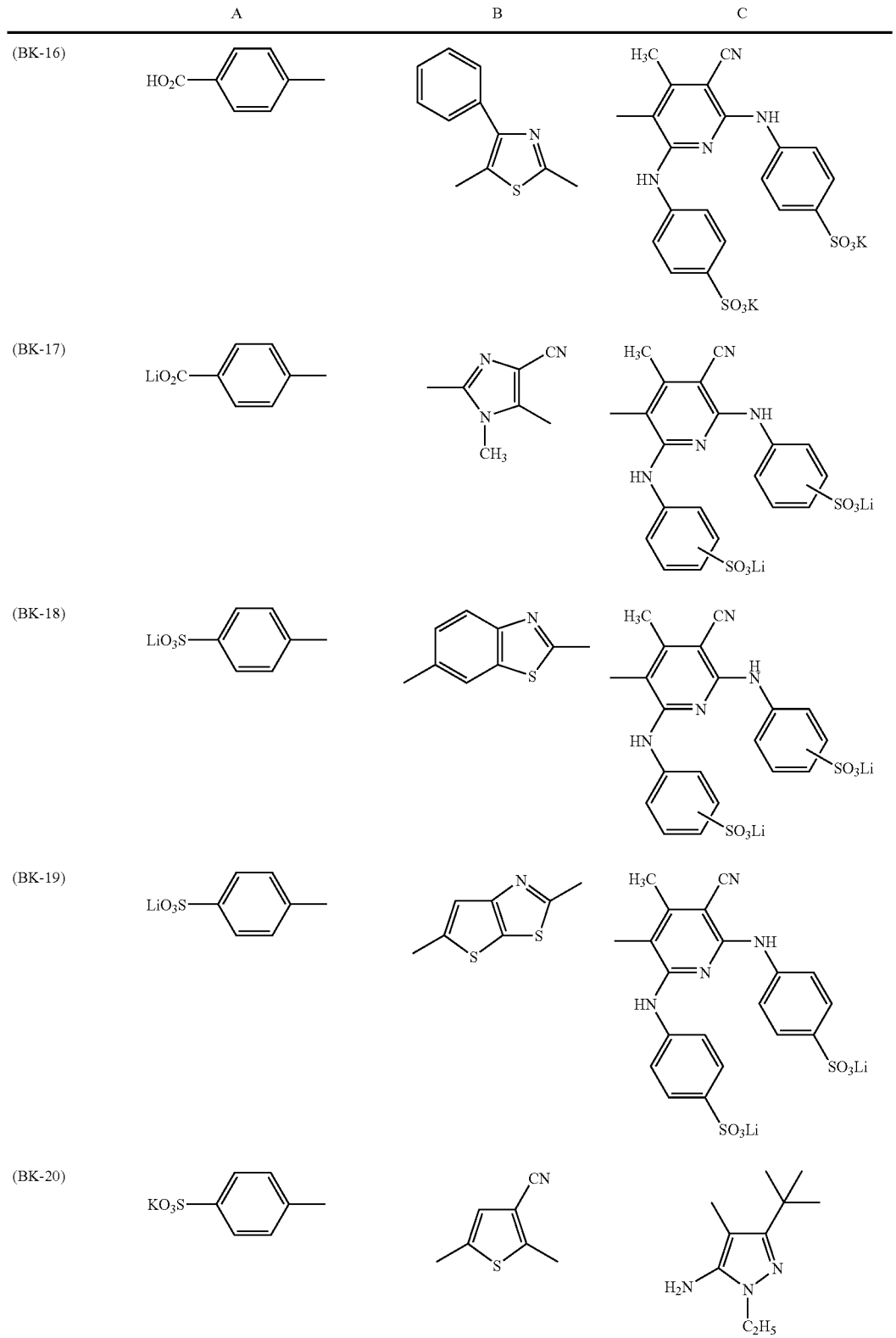

-continued

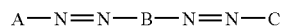

| | A | B | C |
|---|---|---|---|
| (BK-21) | H₄NO₂C-[benzene with methyl]-H₄NO₂C | [thiophene with CN and two methyls] | [pyrazole with CH₃, CH₃, H₂N, phenyl] |

In the following Tables, specific examples of each pair of $(X_1, X_2)$, $(Y_{11}, Y_{12})$, $(Y_{13}, Y_{14})$, $(Y_{15}, Y_{16})$ and $(Y_{17}, Y_{18})$ are independently in an irregular order.

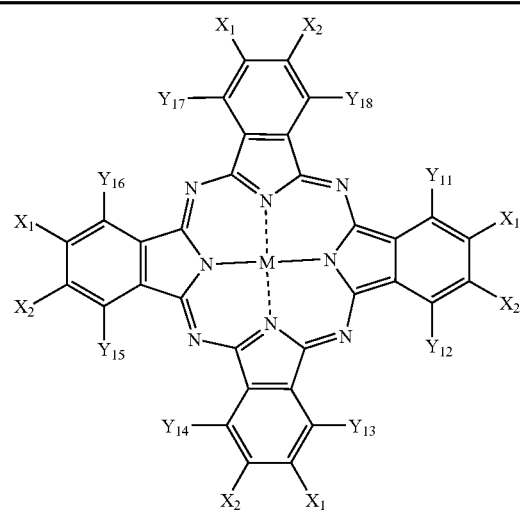

| No. | M | $X_1$ | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| C-1 | Cu | —SO₂—NH—CH₂—CH₂—SO₃Li | —H | —H, —H | —H, —H | —H, —H | —H, —H |
| C-2 | Cu | —SO₂—NH—CH₂—CH(OH)—CO—NH—CH₂CH₂—SO₃Na | —H | —Cl, —H | —Cl, —H | —Cl, —H | —Cl, —H |
| C-3 | Cu | —SO₂—NH—CH₂—CH₂—CH₂—SO₂NH—CH₂CH(OH)—SO₃Li | —H | —H, —H | —H, —H | —H, —H | —H, —H |
| C-4 | Cu | —SO₂—NH—[phenyl]—SO₂NH—CH₂CH₂—SO₃Li | —H | —H, —H | —H, —H | —H, —H | —H, —H |
| C-5 | Ni | —SO₂—NH—CH₂—CH₂—CO—NH—CH(CH₂—COONa)—COONa | —H | —Cl, —H | —Cl, —H | —Cl, —H | —Cl, —H |
| C-6 | Cu | —SO₂—NH—CH₂—CH₂—SO₂—NH—CH₂—COONa | —CN | —H, —H | —H, —H | —H, —H | —H, —H |
| C-7 | Cu | —SO₂—CH₂—CH₂—CH₂—SO₂—NH—CH(CH₂—OH)—COOLi | —H | —H, —H | —H, —H | —H, —H | —H, —H |

-continued

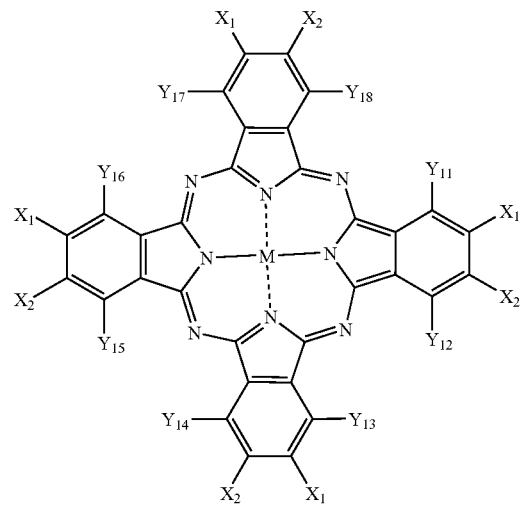

| No. | M | X$_1$ | X$_2$ | Y$_{11}$, Y$_{12}$ | Y$_{13}$, Y$_{14}$ | Y$_{15}$, Y$_{16}$ | Y$_{17}$, Y$_{18}$ |
|---|---|---|---|---|---|---|---|
| C-8 | Cu | —SO$_2$—CH$_2$—CH$_2$—CH$_2$—SO$_3$Li | —H | —H, —H | —H, —H | —H, —H | —H, —H |
| C-9 | Cu | —SO$_2$—CH$_2$—CH$_2$—CH$_2$—SO$_3$K | —H | —H, —H | —H, —H | —H, —H | —H, —H |
| C-10 | Cu | —SO$_2$—(CH$_2$)$_5$—CO$_2$K | —H | —H, —H | —H, —H | —H, —H | —H, —H |

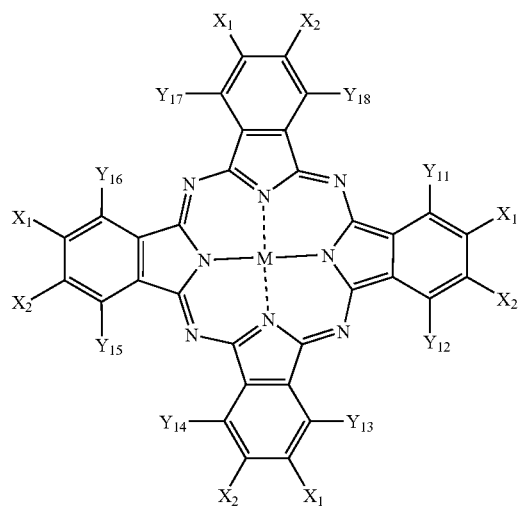

| No. | M | X$_1$ | X$_2$ | Y$_{11}$, Y$_{12}$ | Y$_{13}$, Y$_{14}$ | Y$_{15}$, Y$_{16}$ | Y$_{17}$, Y$_{18}$ |
|---|---|---|---|---|---|---|---|
| C-11 | Cu | —SO$_2$—NH—CH$_2$—CH$_2$—CH$_2$—SO$_2$—NH—CH$_2$CH(OH)—CH$_2$—SO$_3$Li | —H | —H, —H | —H, —H | —H, —H | —H, —H |
| C-12 | Cu | —SO$_2$—NH—CH$_2$—CH$_2$—CH$_2$—SO$_2$NH—CH$_2$—CH(OH)—CH$_3$ | —SO$_3$Li | —H, —H | —H, —H | —H, —H | —H, —H |
| C-13 | Cu | —SO$_2$—CH$_2$—CH(OH)—CH$_2$SO$_3$K | —H | —H, —H | —H, —H | —H, —H | —H, —H |
| C-14 | Cu | —SO$_2$—CH$_2$—CH(OH)—CH$_3$ | —SO$_3$Li | —H, —H | —H, —H | —H, —H | —H, —H |

-continued
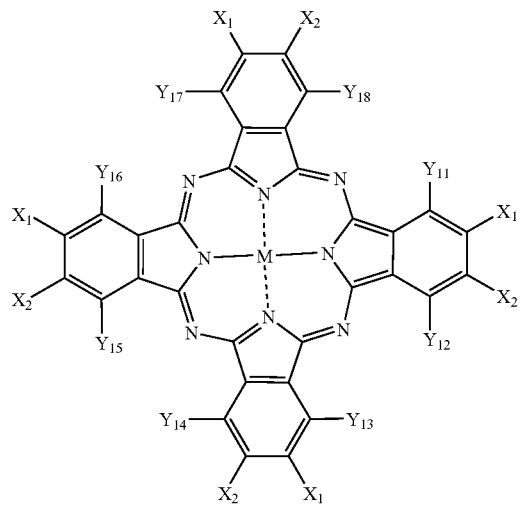
| No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| C-15 | Cu | —SO₂NH(CH₂)₃N⁺(CH₃)(CH₂CH₂OH)₂·CH₃—C₆H₄—SO₃⁻ | —H | —H, —H | —H, —H | —H, —H | —H, —H |
| C-16 | Cu | —CO—NH—CH₂—CH(OH)—CH₂SO₃K | —H | —H, —H | —H, —H | —H, —H | —H, —H |
| C-17 | Cu | —CO—NH—CH(COOLi)—CH₂CH₂SO₃Li | —H | —H, —H | —H, —H | —H, —H | —H, —H |
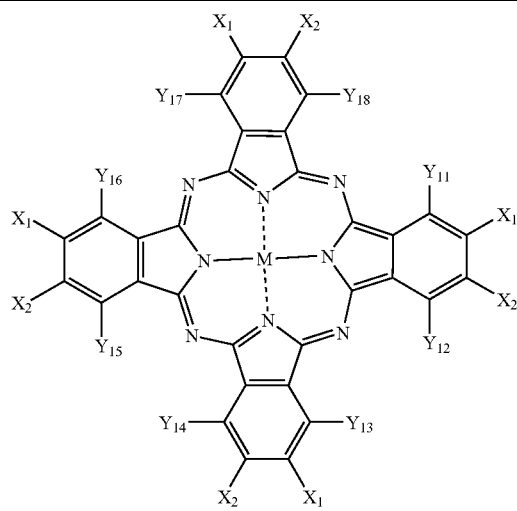
| No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| C-18 | Cu | —SO₂CH₂CH₂CH(CH₃)SO₃Li | —H | —H, —H | —H, —H | —H, —H | —H, —H |

-continued
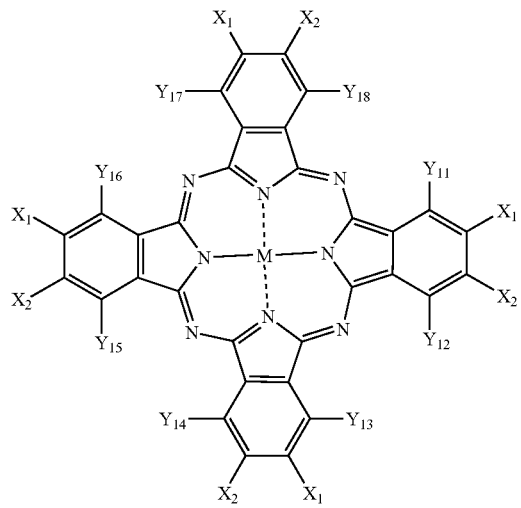
| No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| C-19 | Cu | —SO₂—CH₂—CH(OH)—CH₂—SO₃Na | —H | —H, —H | —H, —H | —H, —H | —H, —H |
| C-20 | Cu | —SO₂—CH₂—CH₂—CH(CH₃)—COOLi | —H | —H, —H | —H, —H | —H, —H | —H, —H |
| C-21 | Cu | —SO₂(CH₂)₃SO₂NHCH₂—CH(OH)—CH₂—SO₃Li | —H | —H, —H | —H, —H | —H, —H | —H, —H |
| C-22 | Cu | —CO₂CH₂CH₂CH₂SO₂—NH—CH₂—CH(OH)—CH₂—SO₃Li | —H | —H, —H | —H, —H | —H, —H | —H, —H |
| C-23 | Cu | —SO₂NH—C₈H₁₇(t) | —H | —H, —H | —H, —H | —H, —H | —H, —H |
| C-24 | Cu | —SO₂—NH—CH₂—CH(CH₂CH₃)—CH₂CHCH₂—CH₃ | —H | —H, —H | —H, —H | —H, —H | —H, —H |

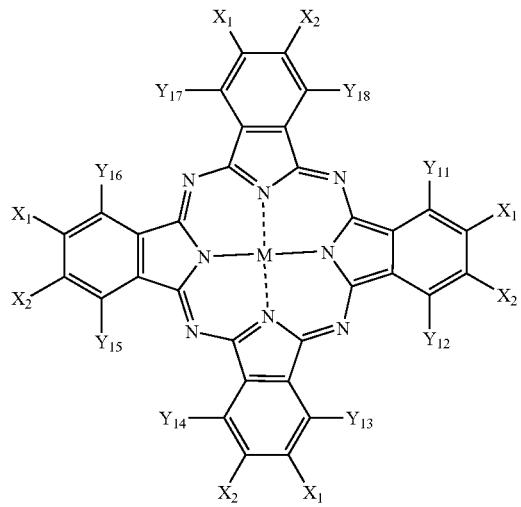

| No. | M | X₁ | X₂ | Y₁₁, Y₁₂ | Y₁₃, Y₁₄ | Y₁₅, Y₁₆ | Y₁₇, Y₁₈ |
|---|---|---|---|---|---|---|---|
| C-25 | Cu | —SO₂CH₂CH₂CH₂SO₂—NH—CH₂—CH(CH₃)—CH₂—CH₃ | —H | —H, —H | —H, —H | —H, —H | —H, —H |
| C-26 | Cu | —SO₂—CH₂—CH₂—CH₂—CO₂—CH(CH₃)—CH₂—O—CH₃ | —H | —H, —H | —H, —H | —H, —H | —H, —H |
| C-27 | Cu | —SO₂CH₂CH₂CH₂SO₂NHCH₂CH₂CH₂O—CH(CH₃)₂ | —H | —H, —H | —H, —H | —H, —H | —H, —H |
| C-28 | Zn | —SO₂—CH₂—CH(OCH₃)—CH₂—O—CH₂ | —CN | —H, —H | —H, —H | —H, —H | —H, —H |
| C-29 | Cu | —CO—NH—CH₂—CH(CH₂CH₃)—CH₂—CH₂—CH₂CH₃ | —H | —Cl, —H | —Cl, —H | —Cl, —H | —Cl, —H |
| C-30 | Cu | —CO₂—CH(CH₃)—CH₂—O—C₄H₉(t) | —H | —H, —H | —H, —H | —H, —H | —H, —H |
| C-31 | Cu | —SO₂—CH₂—CH₂—CH(CH₃)—SO₂—NH—C₆H₃(SO₃Li)₂ | —H | —H, —H | —H, —H | —H, —H | —H, —H |

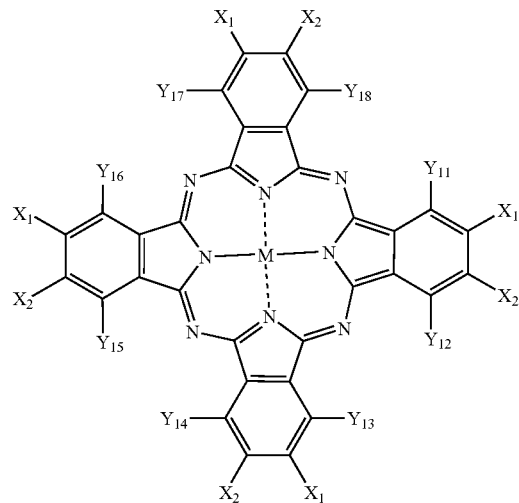
| No. | M | $X_1$ | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| C-32 | Cu | —SO₂NH—C₆H₃(CO₂C₆H₁₃(n))₂ | —H | —H, —H | —H, —H | —H, —H | —H, —H |
| C-33 | Cu | —SO₂NH—C₆H₃(OCH₂CH₂OCH₃)(SO₂NHCH₂CH(C₂H₅)(C₄H₉)) | —H | —H, —H | —H, —H | —H, —H | —H, —H |
| C-34 | Cu | —SO₂NH—C₆H₄—SO₂—NH—CH₂—CH(CH₂CH₃)—CH₂CH₂—CH₂—CH₃ | —H | —H, —H | —H, —H | —H, —H | —H, —H |
| C-35 | Cu | —SO₂—C₆H₃(CO₂Na) | —H | —H, —H | —H, —H | —H, —H | —H, —H |
| C-36 | Cu | —SO₂N(C₄H₉(n))(C₆H₅) | —H | —H, —H | —H, —H | —H, —H | —H, —H |

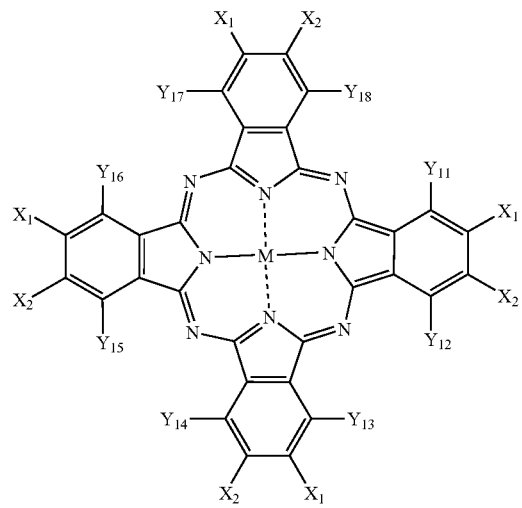
| No. | M | $X_1$ | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| C-37 | Cu | —SO$_2$—(benzothiazole-2-yl with 6-SO$_3$Li) | —H | —H, —H | —H, —H | —H, —H | —H, —H |
| C-38 | Cu | —SO$_2$NH—(3-methyl-pyrazol-5-yl, N1-(2-SO$_3$Li, 5-SO$_3$Li phenyl)) | —H | —H, —H | —H, —H | —H, —H | —H, —H |
| C-39 | Cu | —SO$_2$(CH$_2$)$_3$—NH—CO—(phenyl with two CO$_2$Li) | —Cl | —H, —H | —H, —H | —H, —H | —H, —H |
| C-40 | Cu | —CO$_2$—CH$_2$CH$_2$CH$_2$—NH—(triazine with two NH—CH$_2$—CH$_2$—CH(CH$_3$)—SO$_3$Li) | —H | —H, —H | —H, —H | —H, —H | —H, —H |

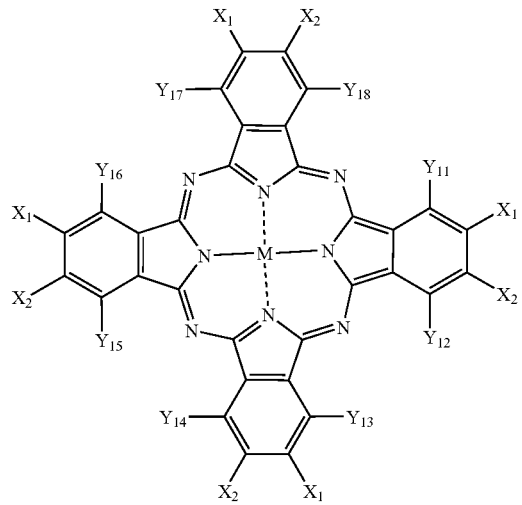

| No. | M | X₁ | X₂ | Y₁₁, Y₁₂ | Y₁₃, Y₁₄ | Y₁₅, Y₁₆ | Y₁₇, Y₁₈ |
|---|---|---|---|---|---|---|---|
| C-41 | Cu | —SO₂NH—CH(COONa)—CH₂—CO—N—(CH₂CH₂OH)₂ | —H | —H, —H | —H, —H | —H, —H | —H, —H |
| C-42 | Cu | —SO₂NH—(C₆H₄)—NHC(O)—(C₆H₄)—SO₃Li | —H | —H, —H | —H, —H | —H, —H | —H, —H |
| C-43 | Cu | —CO—NH—CH₂—CH(OH)—CO—NH—CH(COOK)—CH₂CH₂—SO₃K | —H | —H, —H | —H, —H | —H, —H | —H, —H |
| C-44 | Cu | —SO₂—CH₂CH₂CH₂—NH—CO—(C₆H₄)—CO—NH—CH(COOLi)—CH₂—COOLi | —H | —H, —H | —H, —H | —H, —H | —H, —H |
| C-45 | Cu | —SO₂CH₂CH₂OCH₂CH₂OCH₂CH₂SO₃Li | —H | —H, —H | —H, —H | —H, —H | —H, —H |

In the following Tables, introduction sites of substituents ($R_1$) and ($R_2$) are in an irregular order within the β-position substitution type.

| | | M—Pc($R_1$)$_m$($R_2$)$_n$ | | | |
|---|---|---|---|---|---|
| No. | M | $R_1$ | m | $R_2$ | n |
| C-46 | Cu | —SO₂—NH—CH₂—CH(CH₃)—SO₃Li | 3 | —SO₂—NH—CH₂—CH(OH)—CH₃ | 1 |
| C-47 | Cu | —SO₂—NH—CH₂—CH₂SO₃Li | 3 | —SO₂—NH—CH₂—CH₂—CH₂—SO₂—NH—CH₂—CH(OH)—CH₃ | 1 |

| No. | M | R$_1$ | m | R$_2$ | n |
|---|---|---|---|---|---|
| C-48 | Cu | —SO$_2$—NH—CH$_2$—CH(CH$_3$)—SO$_3$Li | 3 | —SO$_2$NH—CH$_2$—CH$_2$—CH$_2$—SO$_2$—NH—CH$_2$—CH$_2$—O—CH$_2$—CH$_2$—OH | 1 |
| C-49 | Cu | —SO$_2$—NH—CH$_2$—CH(CH$_3$)—SO$_3$Li | 2 | —SO$_2$—NH—CH$_2$—CH$_2$—CH$_2$—CO—N(CH$_2$—CH$_2$—OH)$_2$ | 2 |
| C-50 | Cu | —SO$_2$—NH—CH$_2$—CH$_2$—SO$_2$—NH—CH$_2$CH$_2$—COONa | 3 | —SO$_2$NH—CH(CH$_3$)—CH$_2$OH | 1 |
| C-51 | Cu | —SO$_2$—NH—C$_6$H$_4$—SO$_2$NH—CH$_2$—CH(OH)—SO$_3$Li | 3 | —SO$_2$NH—CH$_2$—CH$_2$—O—CH$_2$—CH$_2$—OH | 1 |
| C-52 | Cu | —SO$_2$—CH$_2$—CH$_2$—CH(CH$_3$)—SO$_3$Li | 2.5 | —SO$_2$—CH$_2$—CH$_2$—O—CH$_2$—CH$_2$—OH | 1.5 |
| C-53 | Cu | —SO$_2$—CH$_2$—CH$_2$—CH(CH$_3$)—SO$_3$Na | 2 | —SO$_2$—CH$_2$—CH$_2$—CH$_2$—CO—N(CH$_2$—CH$_2$—OH)$_2$ | 2 |
| C-54 | Cu | —SO$_2$—CH$_2$—CH$_2$—CH$_2$—SO$_3$Li | 3 | —SO$_2$—CH$_2$—CH$_2$—CH$_2$—SO$_2$—NH—CH$_2$—CH(OH)—CH$_3$ | 1 |
| C-55 | Cu | —SO$_2$—CH$_2$—CH$_2$—CH$_2$—COOK | 2 | —SO$_2$—CH$_2$—CH$_2$—CH$_2$—SO$_2$—NH—CH$_2$—CH(OH)—CH$_2$—COOK | 2 |
| C-56 | Cu | —SO$_2$—CH$_2$—CH$_2$—CH$_2$—SO$_3$Li | 3 | —SO$_2$—CH$_2$—CH(OH)—CH$_2$—SO$_3$Li | 1 |
| C-57 | Cu | —SO$_2$—CH$_2$—CH$_2$—O—CH$_2$—CH$_2$—SO$_3$Li | 2 | —SO$_2$—CH$_2$—CH$_2$—CH$_2$—CO$_2$—CH$_2$—CH$_2$—CH(OH)—CH$_2$—COOK | 2 |
| C-58 | Cu | —SO$_2$—CH$_2$—CH(OH)—CH$_2$—SO$_3$Li | 3 | —SO$_2$—CH$_2$—C$_6$H$_4$—SO$_2$NH—CH$_2$—CH(OH)—CH$_2$—OH | 1 |
| C-59 | Cu | —SO$_2$NHCH$_2$CH$_2$—SO$_3$Li | 3 | —SO$_2$—CH$_2$—CH$_2$—CH$_2$—SO$_2$—NH—CH$_2$—CH(OH)—CH$_3$ | 1 |
| C-60 | Cu | —SO$_2$—CH$_2$—CH$_2$—O—CH$_2$—CH$_2$—O—CH$_2$—CH$_2$—SO$_3$Na | 3 | —SO$_2$—CH$_2$—CH$_2$—CH$_2$—CO—N(CH$_2$—CH$_2$—COONa)(CH$_2$—COONa) | 1 |

-continued

| No. | M | $R_1$ | m | $R_2$ | n |
|---|---|---|---|---|---|
| | | | $M-Pc(R_1)_m(R_2)_n$ | | |
| C-61 | Cu | $-SO_2CH_2CH_2CH_2SO_3Li$ | 3 | $-SO_2CH_2CH_2CH_2SO_2NHCH_2-CH(OH)-CH_2SO_3Li$ | 1 |
| C-62 | Cu | $-SO_2CH_2CH_2CH_2SO_3Li$ | 2 | $-SO_2CH_2CH_2OCH_2CH_2OCH_2CH_2OH$ | 2 |
| C-63 | Cu | $-SO_2CH_2CH_2CH_2SO_3K$ | 3 | $-SO_2CH_2CH_2CH_2SO_2NH-CH(CH_3)-CH_2-OH$ | 1 |
| C-64 | Cu | $-SO_2CH_2CH_2CH_2SO_3Li$ | 2 | $-SO_2CH_2CH_2CH_2SO_2N(CH_2CH_2OH)_2$ | 2 |
| C-65 | Cu | $-CO-NH-CH_2-CH_2-SO_3K$ | 3 | $-CO-NH-CH_2-CH_2-O-CH_2-CH_2-OH$ | 1 |
| C-66 | Cu | $-CO-NH-CH_2-CH_2-SO_2-NH-CH_2-CH_2-COONa$ | 3 | $-CO-NH-CH_2-CH(OH)-CH_3$ | 1 |
| C-67 | Cu | $-SO_2(CH_2)_3SO_2NHCH_2-CH(OH)-CH_2CO_2Li$ | 2.5 | $-CO-NH-CH_2-CH_2-CH_2-CO-N(CH_2-CH_2-OH)_2$ | 1.5 |
| C-68 | Cu | $-CO_2-CH_2-CH_2-CH(CH_3)-SO_3Na$ | 2 | $-CO-CH_2-CH_2-CH_2-CO-N(CH_2-CH_2-OH)_2$ | 2 |
| C-69 | Cu | $-CO_2-CH_2-CH_2-CH_2-SO_3Li$ | 3 | $-CO_2-CH_2-CH_2-CH_2-SO_2-NH-CH_2-CH(OH)-CH_3$ | 1 |
| C-70 | Cu | $-CO_2-CH_2-CH_2-CH_2COOK$ | 2 | $-CO_2-CH_2-CH_2-CH_2-SO_2-NH-CH_2-CH(OH)-CH_2-COOK$ | 2 |

| No. | M | $R_1$ | m | $R_2$ | n |
|---|---|---|---|---|---|
| C-71 | Cu | $-CO_2-CH_2-CH_2-O-CH_2-CH_2-O-CH_2-CH_2-SO_3Na$ | 3 | $-CO_2-CH_2-\underset{\underset{OH}{\mid}}{C}H-CH_2-SO_2NH-$ ⌬ -OH | 1 |
| C-72 | Cu | $-SO_2CH_2CH_2OCH_2CH_2O-CH_2CH_2SO_3K$ | 2 | $-CO_2-CH_2-CH_2-CO_2-CH_2-\underset{\underset{OH}{\mid}}{C}H-CH_2-COOK$ | 2 |
| C-73 | Cu | $-SO_2(CH_2)_3SO_2NHCH_2\underset{\underset{OH}{\mid}}{C}HCH_2OH$ | 2 | $-CO_2-CH_2-\underset{\underset{OH}{\mid}}{C}H-CH_2-SO_3Li$ | 2 |
| C-74 | Cu | $-SO_2(CH_2)_3SO_2NHCH_2-\underset{\underset{OH}{\mid}}{C}H-CH_2SO_3K$ | 3 | $-CO_2-CH_2-CH_2-SO_2-NH-CH_2-\underset{\underset{OH}{\mid}}{C}H-CH_3$ | 1 |
| C-75 | Cu | $-SO_2(CH_2)_3SO_2NH(CH_2)_3N(CH_2CH_2OH)_2$ | 2 | $-CO_2-CH_2-CH_2-CO-\underset{\underset{CH_2-CH_2-COOLi}{\mid}}{N}-CH_2-COOLi$ | 2 |
| C-76 | Cu | $-SO_2-CH_2-CH_2-SO_2-NH-CH_2-\underset{\underset{OH}{\mid}}{C}H-CH_3$ | 3 | $-SO_2-CH_2-CH_2-SO_2-NH-CH_2-\underset{\underset{CH_2CH_3}{\mid}}{C}H-CH_2CH_2-CH_2CH_3$ | 1 |

-continued

| No. | M | $R_1$ | M—Pc($R_1$)$_m$($R_2$)$_n$ | | |
|---|---|---|---|---|---|
| | | | m | $R_2$ | n |
| C-77 | Cu | —SO$_2$—CH$_2$—CH$_2$—O—CH$_2$—CH$_2$—O—CH$_3$ | 2 | —SO$_2$—CH$_2$—CH$_2$—SO$_2$—NH—CH$_2$—CH(OH)—CH$_3$ | 1 |
| C-78 | Cu | —SO$_2$—CH$_2$—CH$_2$—O—CH$_2$—CH$_2$—O—CH$_2$—CH$_2$—OH | 3 | —SO$_2$—CH$_2$—CH$_2$—CH$_2$—CO$_2$—CH$_2$—CH(CH$_2$CH$_3$)—CH$_2$CH$_2$—CH$_2$CH$_3$ | 1 |
| C-79 | Cu | —SO$_2$—CH$_2$—CH(CH$_2$CH$_3$)—CH$_2$CH$_2$—CH$_2$CH$_3$ | 2 | —SO$_2$—CH$_2$—CH$_2$—SO$_2$—NH—CH$_2$—CH(O—CH$_3$)—CH$_3$ | 2 |
| C-80 | Cu | —SO$_2$—CH$_2$—CH$_2$—CH$_2$—SO$_2$—NH—CH$_2$—CH(O—CH$_3$)—CH$_3$ | 3 | —SO$_2$NH—CH$_2$—CH$_2$—SO$_2$NH—CH$_2$—CH$_2$—O—CH$_2$—CH$_2$—OH | 1 |
| C-81 | Cu | —SO$_2$—CH$_2$—CH$_2$—CH$_2$—CO$_2$—NH—CH(CH$_3$)—CH$_2$—CH$_3$ | 3 | —SO$_2$—CH$_2$—CH$_2$—SO$_2$—NH—CH(CH$_3$)$_2$ | 1 |
| C-82 | Cu | —SO$_2$—CH$_2$—CH$_2$—CH$_2$—SO$_2$NH—CH$_2$—CH(OH)—CH$_3$ | 2.5 | —SO$_2$—CH$_2$—CH$_2$—CH$_2$—CO$_2$—NH—CH(CH$_3$)—CH$_2$—CH$_3$ | 1.5 |

| No. | M | $R_1$ | m | $R_2$ | n |
|---|---|---|---|---|---|
| | | $M-Pc(R_1)_m(R_2)_n$ | | | |
| C-83 | Cu | $-SO_2-CH_2-CH_2-CH_2-CO_2-NH-CH(CH_3)-CH_2-CH_3$ | 2 | $-SO_2-CH_2-CH_2-CH_2SO_2-NH-(CH_2)_3-CH_2-O-CH_2CH_2-OH$ | 2 |
| C-84 | Cu | $-SO_2-CH_2-CH_2-CH_2-SO_2-NH-CH_2-CH(OH)-CH_3$ | 3 | $-SO_2-CH_2-CH_2-O-CH_2-CH_2-O-CH_3$ | 1 |
| C-85 | Cu | $-SO_2-CH_2-CH_2-CH_2-SO_2-NH-CH_2-CH(OH)-CH_3$ | 3 | $-SO_2-CH_2-CH_2-O-CH_2-CH_2-O-CH_2-CH_2-O-CH_3$ | 1 |
| C-86 | Cu | $-SO_2-CH_2-CH_2-CH_2-CO_2-NH-CH(CH_3)-CH_2-CH_3$ | 3 | $-SO_2-CH_2-CH_2-O-CH_2-CH_2-O-CH_2-CH_2-OH$ | 1 |
| C-87 | Cu | $-SO_2-CH_2-CH_2-CH_2-SO_2-NH-CH(CH_3)_2$ | 3 | $-CO_2-CH_2-CH(CH_2CH_3)-CH_2-CH_2-CH_2CH_3$ | 1 |
| C-88 | Cu | $-CO_2-CH_2-CH_2-CH_2-CO_2-NH-CH(CH_3)-CH_2-CH_3$ | 3 | $-CO_2-CH_2-CH_2-O-CH_2-CH_2-O-CH_3$ | 1 |
| C-89 | Cu | $-CO-NH-CH_2-CH_2-SO_2-NH-CH(CH_3)_2$ | 3 | $-SO_2-NH-CH_2-CH(CH_2CH_3)-CH_2-CH_2-CH_2-CH_3$ | 1 |
| C-90 | Cu | $-CO-NH-CH_2-CH(CH_2CH_3)-CH_2-CH_2-CH_2CH_3$ | 3 | $-CO-NH-CH_2-CH_2-O-CH_2-CH_2-O-CH_3$ | 1 |

[Inkjet Recording Ink]

The inkjet recording ink can be produced by dissolving and/or dispersing the above-described dye in a lipophilic or aqueous medium. Preferably, an aqueous medium is used. If desired, other additives are contained within the range of not impairing the effect of the present invention. Examples of other additives include known additives such as drying inhibitor (wetting agent), discoloration inhibitor, emulsification stabilizer, permeation accelerator, ultraviolet absorbent, antiseptic, fungicide, pH adjusting agent, surface tension adjusting agent, defoaming agent, viscosity controlling agent, dispersant, dispersion stabilizer, rust inhibitor and chelating agent. These various additives are directly added to the ink solution in the case of a water-soluble ink. When an oil-soluble dye is used in the form of a dispersion, the additives are generally added to the dispersion after the preparation of a dye dispersion but may be added to the oil or aqueous phase at the preparation.

The drying inhibitor is suitably used for the purpose of preventing occurrence of clogging due to drying of the inkjet ink at the ink jetting port of a nozzle used for the inkjet recording system.

The drying inhibitor is preferably a water-soluble organic solvent having a vapor pressure lower than water. Specific examples thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. The drying inhibitor is preferably contained in the ink in an amount of 10 to 50 wt %.

The permeation accelerator is suitably used for the purpose of obtaining higher permeation of the inkjet ink into paper. Examples of the permeation accelerator which can be used include alcohols such as ethanol, isopropanol, butanol, di(tri)ethylene glycol monobutyl ether and 1,2-hexanediol, sodium laurylsulfate, sodium oleate and nonionic surfactants. A sufficiently high effect can be usually obtained by adding from 5 to 30 wt % of the permeation accelerator to the ink. The permeation accelerator is preferably used in an amount within the range of causing no blurring of printed letter or no print through.

The ultraviolet absorbent is used for the purpose of improving the preservability of image. Examples of the ultraviolet absorbent which can be used include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-base compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-

53427, JP-A-8-239368, JP-A-10-182621 and JP-T-8-501291 (the term "JP-T" as used herein means a published Japanese translation of a PCT patent application"), compounds described in *Research Disclosure* No. 24239, and compounds of absorbing ultraviolet light and emitting fluorescent light, so-called fluorescent brightening agents represented by stilbene-base compound and benzoxazole-base compound.

The discoloration inhibitor is used for the purpose of improving the preservability of image. Examples of the discoloration inhibitor which can be used include various organic discoloration inhibitors and metal complex-base discoloration inhibitors. Examples of the organic discoloration inhibitor include hydroquinones, alkoxyphenols, dialkoxyphenols, phenols, anilines, amines, indanes, chromans, alkoxyanilines and heterocyclic rings. Examples of the metal complex include nickel complex and zinc complex. More specifically, compounds described in patents cited in *Research Disclosure*, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

Examples of the fungicide include sodium dehydro-acetate, sodium benzoate, sodium pyridinethione-1-oxide, ethyl p-hydroxybenzoate, 1,2-benzisothiazolin-3-one and salts thereof. The fungicide is preferably used in the ink in an amount of 0.02 to 1.00 wt %.

As the pH adjusting agent, the above-described neutralizer (e.g., organic base, inorganic alkali) can be used. The pH adjusting agent is used for the purpose of improving the storage stability of the inkjet ink and is preferably added to adjust the inkjet ink to a pH of 6 to 10, more preferably to a pH of 7 to 10.

The surface tension adjusting agent includes nonionic, cationic and anionic surfactants. Preferred examples of the surfactant include anionic surfactants such as fatty acid salt, alkylsulfuric ester salt, alkylbenzenesulfonate, alkylnaphthalenesulfonate, dialkylsulfosuccinate, alkyl-phosphoric ester salt, naphthalenesulfonic acid formalin condensate and polyoxyethylenealkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which is an acetylene-base polyoxyethylene oxide surfactant, is preferably used. In addition, amine oxide-type amphoteric surfactants such as N,N-dimethyl-N-alkylamine oxide are preferred. Furthermore, surfactants described in JP-A-59-157636 (pages (37) to (38)) and *Research Disclosure*, No. 308119 (1989) can be also used.

As the defoaming agent, for example, a chelating agent represented by the fluorine- or silicon-containing compound and EDTA can be used, if desired.

When the dye of the present invention is oil-soluble, the dye is preferably dispersed in an aqueous medium by a method where a colored fine particle containing the dye and an oil-soluble polymer is dispersed in an aqueous medium described in JP-A-11-286637 and Japanese Patent Application Nos. 2000-78491, 2000-80259 and 2000-62370, or a method where the dye of the present invention dissolved in a high boiling point organic solvent is dispersed in an aqueous medium described in Japanese Patent Application Nos. 2000-78454, 2000-78491, 2000-203856 and 2000-203857. With respect to the specific method for dispersing the dye of the present invention in an aqueous medium, the oil-soluble polymer, high boiling point organic solvent and additives used and the amounts thereof, those described in the above patent publications can be preferably used. Also, the dye which is solid can be dispersed as it is in a fine particle state. At the dispersion, a dispersant or a surfactant can be used. As for the dispersing device, a simple stirrer, an impeller stirring system, an in-line stirring system, a mill system (e.g., colloid mill, ball mill, sand mill, attritor, roll mill, agitator mill), an ultrasonic wave system and a high-pressure emulsification dispersion system (high-pressure homogenizer and as the commercially available device, specific examples thereof include Gaulin Homogenizer, Microfluidizer and DeBEE 2000) can be used. The preparation method of the inkjet recording ink is described in detail, in addition to the above patent publications, in JP-A-5-148436, JP-A-5-295312, JP-A-7-97541, JP-A-7-82515, JP-A-7-118584, JP-A-11-286637 and Japanese Patent Application No. 2000-87539 and the methods described in these patent publications can be used also for the preparation of the inkjet recording ink of the present invention.

As the aqueous medium, a mixture comprising water as the main component and a water-miscible organic solvent added, if desired, can be used. Examples of the water-miscible organic solvent include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethyl-propylenediamine) and other polar solvents (e.g., formamide, N, N-dimethylformamide, N, N-dimethylacetamide, dimethyl-sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof.

The inkjet recording ink of the present invention preferably contains from 0.2 to 10 parts by weight of the dye of the present invention per 100 parts by weight of the ink. Furthermore, the yellow, magenta and cyan inkjet inks of the present invention each may contain two or more dyes in combination. All of these dyes preferably have an oxidation potential of 1.0 V or more. In the case of using two or more dyes in combination, the total content of the dyes is preferably in the above-described range.

In recent years, yellow, magenta and cyan inks each is often composed of two or more inks differing in the dye concentration so as to obtain higher image quality. In the present invention, the dyes used in the deep or light color ink all preferably have an oxidation potential nobler than 1.0 V.

The viscosity at 25° C. of the inkjet recording ink of the present invention is generally from 1 to 40 mPa·s, preferably from 1 to 30 mPa·s, more preferably from 1 to 20 mPa·s. The surface tension thereof at 25° C. is, irrespective of dynamic or static surface tension, generally from 20 to 100 mN/m, preferably from 20 to 70 mN/m, more preferably from 20 to 50 mN/m. The viscosity and the surface tension can be adjusted by the addition of various additives, for example, a viscosity adjusting agent, a surface tension adjusting agent, a resistivity adjusting agent, a film adjusting agent, an ultraviolet absorbent, an antioxidant, a discoloration inhibitor, a fungicide, a rust preventive, a dispersant and a surfactant.

The inkjet recording ink of the present invention is used for the formation of a full color image but for adjusting the color tone, a black color tone ink may be further used. Examples of the black coloring material which can be used include disazo, trisazo and tetraazo dyes and a dispersion of carbon black.

[Inkjet Recording Method]

According to the inkjet recording method of the present invention, an energy is provided to the inkjet recording ink and thereby an image is formed on a known image-receiving material, namely, plain paper, resin coated paper, inkjet special paper described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, electrophotographic common paper, cloth, glass, metal, ceramic or the like.

In forming an image, a polymer latex compound may be used in combination for the purpose of giving glossiness or water resistance or improving the weather resistance. The timing of imparting the latex compound to the image-receiving material may be before, after or simultaneous with the addition of the coloring agent. Accordingly, the site to which the latex compound added may be in the image-receiving paper or ink, or a liquid material composed of the polymer latex alone may be prepared and used. More specifically, the methods described in Japanese Patent Application Nos. 2000-363090, 2000-315231, 2000-354380, 2000-343944 and 2000-268952 can be preferably used.

The recording paper and recording film for use in the inkjet printing employing the ink of the present invention are described below. The support which can be used for the recording paper or film is produced, for example, from a chemical pulp such as LBKP and NBKP, a mechanical pulp such as GP, PGW, RMP, TMP, CTMP, CMP and CGP, a waste paper pulp such as DIP, by mixing thereto, if desired, additives such as conventionally known pigment, binder, sizing agent, fixing agent, cation agent and paper strength increasing agent and then sheeting the mixture using various devices such as Fourdrinier paper machine and cylinder paper machine. Other than this support, synthetic paper or plastic film may be used. Th thickness of the support is preferably from 10 to 250 μm and the basis weight is preferably from 10 to 250 g/m². An ink-accepting layer and a backcoat layer may be provided on the support as it is or may be provided after providing a size press or anchor coat layer using starch, polyvinyl alcohol or the like. The support may also be subjected to a flattening treatment by a calendering device such as machine calender, TG calender and soft calender. In the present invention, the support is preferably paper or plastic film of which both surfaces are laminated with polyolefin (for example, polyethylene, polystyrene, polyethylene terephthalate, polybutene or a copolymer thereof). In the polyolefin, a white pigment (for example, titanium oxide or zinc oxide) or a tinting dye (for example, cobalt blue, ultramarine or neodymium oxide) is preferably added.

The ink-accepting layer provided on the support contains a pigment and an aqueous binder. The pigment is preferably a white pigment. The white pigment includes a white inorganic pigment such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and an organic pigment such as styrene-base pigment, acryl-base pigment, urea resin and melamine resin. The white pigment contained in the ink-accepting layer is preferably a porous inorganic pigment, more preferably a synthetic amorphous silica or the like having a large pore area. The synthetic amorphous silica may be either a silicic acid anhydride obtained by a dry production method or a silicic acid hydrate obtained by a wet production method, but a silicic acid hydrate is preferred.

Examples of the aqueous binder contained in the ink-accepting layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivative, and water-dispersible polymers such as styrene butadiene latex and acryl emulsion. These aqueous binders can be used individually or in combination of two or more thereof. In the present invention, among these, polyvinyl alcohol and silanol-modified polyvinyl alcohol are preferred in view of attaching property to the pigment and peeling resistance of the ink-accepting layer.

The ink-accepting layer may contain a mordant, a water-proofing agent, a light fastness enhancer, a surfactant and other additives in addition to the pigment and the aqueous binder.

The mordant added to the ink-accepting layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent image quality can be obtained and at the same time, light fastness of the image is improved.

The water-proofing agent is effective for water-proofing the image. The water-proofing agent is preferably a cationic resin. Examples of the cationic resin include polyamidopolyamine epichlorohydrin, polyethyleneimine, polyaminesulfone, poly-dimethyldiallylammonium chloride, cation polyacrylamide and colloidal silica. Among these cationic resins, polyamidopolyamine epichlorohydrin is preferred. The content of the cationic resin is preferably from 1 to 15 wt %, more preferably from 3 to 10 wt %, based on the entire solid content of the ink-accepting layer.

Examples of the light fastness enhancer include zinc sulfate, zinc oxide, hindered amine-base antioxidants and benzotriazole-base ultraviolet absorbents such as benzophenone. Among these, zinc sulfate is preferred.

The surfactant functions as a coating aid, a releasability improver, a slipperiness improver or an antistatic agent. The surfactant is described in JP-A-62-173463 and JP-A-62-183457. In place of the surfactant, an organofluoro compound may be used. The organofluoro compound is preferably hydrophobic. Examples of the organofluoro compound include a fluorine-containing surfactant, an oily fluorine-base compound (for example, fluorine oil) and a solid fluorine compound resin (for example, ethylene tetrafluoride resin). The organofluoro compound is described in JP-B-57-9053 (columns 8 to 17), JP-A-61-20994 and JP-A-62-135826. Other additives added to the ink-accepting layer include a pigment dispersant, a thickener, a defoaming agent, a dye, a fluorescent brightening agent, an antiseptic, a pH adjusting agent, a matting agent, a hardening agent and the like. The ink-accepting layer may be either one layer or two layers.

In the recording paper or film, a backcoat layer may also be provided. Examples of the component which can be added to this layer include a white pigment, an aqueous binder and other components. Examples of the white pigment contained in the backcoat layer include white inorganic pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion. Other components contained in the backcoat layer include a defoaming agent, a foam inhibitor, a dye, a fluorescent brightening agent, an antiseptic, a water-proofing agent and the like.

A polymer latex may be added to a constituent layer (including the backcoat layer) of the inkjet recording paper or film. The polymer latex is used for the purpose of improving film properties, for example, stabilizing the dimension and preventing the curling, adhesion or film cracking. The polymer latex is described in JP-A-62-245258, JP-A-62-1316648 and JP-A-62-110066. When a polymer latex having a low glass transition temperature (40° C. or less) is added to a layer containing a mordant, the layer can be prevented from cracking or curling. The curling can also be prevented by adding a polymer latex having a high glass transition temperature to the backcoat layer.

The ink of the present invention is not limited in the inkjet recording system and is used in a known system such as an electric charge control system of jetting out the ink by using the electrostatic induction force, a drop-on-demand system (pressure pulse system) of using an oscillation pressure of a piezoelectric device, an acoustic inkjet system of converting electric signals into acoustic beams, irradiating the beams on the ink and jetting out the ink by using the radiation pressure, and a thermal inkjet system of heating the ink to form bubbles and utilizing the generated pressure. The inkjet recording system includes a system of ejecting a large number of small volumes of so-called photo-ink having a low concentration, a system designed to improve the image quality by using a plurality of inks substantially same in the color hue but differing in the concentration, and a system of using colorless transparent ink.

EXAMPLES

The present invention is described in greater detail below by referring to Examples, however, the present invention is not limited to these Examples.

Example 1

Preparation of Aqueous Ink

Deionized water was added to the following components to make 1 liter and the resulting solution was stirred for 1 hour under heating at 30 to 40° C. Thereafter, the solution was adjusted to a pH of 9 with 10 mol/L of KOH and then filtered under reduced pressure through a microfilter having an average pore size of 0.25 μm to prepare a light magenta ink solution.

| <Composition of Light Magenta Ink Solution> | |
|---|---|
| Dye (T-1) | 7.5 g/liter |
| Diethylene glycol | 150 g/liter |
| Urea | 37 g/liter |
| Glycerin | 130 g/liter |
| Triethylene glycol monobutyl ether | 130 g/liter |
| Triethanolamine | 6.9 g/liter |
| Benzotriazole | 0.08 g/liter |
| SURFYNOL 465 (produced by Air Products Japan) | 10.5 g/liter |
| PROXEL XL2 (microbicide, produced by ICI Japan) | 3.5 g/liter |

A magenta ink, a light cyan ink, a cyan ink, a yellow ink and a black ink were further prepared by changing the dye species and additives and using these inks, Ink Set 101 having concentrations shown in Table 1 was prepared.

TABLE 1

| | Light Magenta | Magenta | Light Cyan | Cyan | Yellow | Black |
|---|---|---|---|---|---|---|
| Dye (g/liter) | T-1 7.5 | T-1 30.0 | T-2 8.75 | T-2 35.0 | T-3 29.0 | T-4 20.0 T-5 20.0 T-6 20.0 T-3 21.0 |
| Diethylene glycol (g/liter) | 150 | 110 | 200 | 130 | 160 | 20 |
| Urea (g/liter) | 37 | 46 | — | — | — | — |
| Glycerin (g/liter) | 130 | 160 | 150 | 180 | 150 | 120 |
| Triethylene glycol monobutyl ether (g/liter) | 130 | 140 | 130 | 140 | 180 | — |
| Diethylene glycol monobutyl ether (g/liter) | — | — | — | — | — | 230 |
| 2-Pyrrolidone (g/liter) | — | — | — | — | — | 81 |
| SURFYNOL 465 (g/liter) | 10.5 | 10.0 | 9.8 | 10.5 | — | — |
| SURFYNOL STG (g/liter) | — | — | — | — | 8.5 | 9.8 |
| Triethanolamine (g/liter) | 6.9 | 7.0 | 6.0 | 6.3 | 0.9 | 17.9 |
| Benzotriazole (g/liter) | 0.08 | 0.07 | 0.08 | 0.08 | 0.06 | 0.06 |
| Proxel XL2 (g/liter) | 3.5 | 1.5 | 1.1 | 1.2 | 1.5 | 1.1 |

Ink Sets 102 to 113 were prepared by changing the dye species in each of light magenta, magenta, light cyan, cyan, yellow and black inks of Ink Set 101 as shown in Table 2. In changing the dye, each dye was fundamentally replaced by an equimolar amount of dye and the dye concentration of each ink solution was adjusted to give the same transmission density as in Ink Set 101. When dyes were used in combination, the dyes were used in equimolar amounts.

TABLE 2

| Ink Set | Light Magenta | Magenta | Light Cyan | Cyan | Yellow | Black | Remarks |
|---|---|---|---|---|---|---|---|
| 101 | T-1 | T-1 | T-2 | T-2 | T-3 | T-4, T-5, T-6, T-3 | Comparison |
| 102 | T-7 | T-1 | C-8 | C-8 | T-3 | T-4, T-5, T-6, T-3 | Comparison |
| 103 | T-1 | T-1 | C-8 | C-8 | Y-22 | Bk-7 | Comparison |
| 104 | M-36 | M-36 | C-8 | C-8 | T-3 | Bk-7 | Comparison |
| 105 | M-36 | M-36 | C-8 | C-8 | Y-22 | T-4, T-5, T-6, T-3 | Comparison |
| 106 | M-36 | M-36 | C-8 | C-8 | Y-22 | Bk-7 | Invention |
| 107 | M-36 | M-40 | C-8 | C-1 | Y-22 | Bk-9 | Invention |
| 108 | M-34 | M-36 | C-18 | C-18 | Y-2 | Bk-8 | Invention |
| 109 | M-36 | M-50 | C-54 | C-54 | Y-34 | Bk-9 | Invention |
| 110 | M-36 | M-12 | C-54 | C-8 | Y-26 | Bk-9 | Invention |
| 111 | M-36 | M-32 | C-54 | C-54 | Y-36 | Bk-7 | Invention |
| 112 | M-36 | M-80 | C-54 | C-54 | Y-59 | Bk-9 | Invention |
| 113 | M-36 | M-37 | C-54 | C-54 | Y-58 | Bk-15 | Invention |
| 114 | M-36 | M-36 | C-8 | C-8 | Y-22 | Black Ink A | Invention |

Dyes T-1 to T-7 for comparison in Tables 1 and 2 are below.

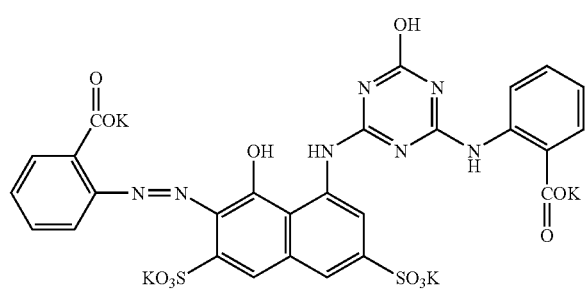

(T-1)

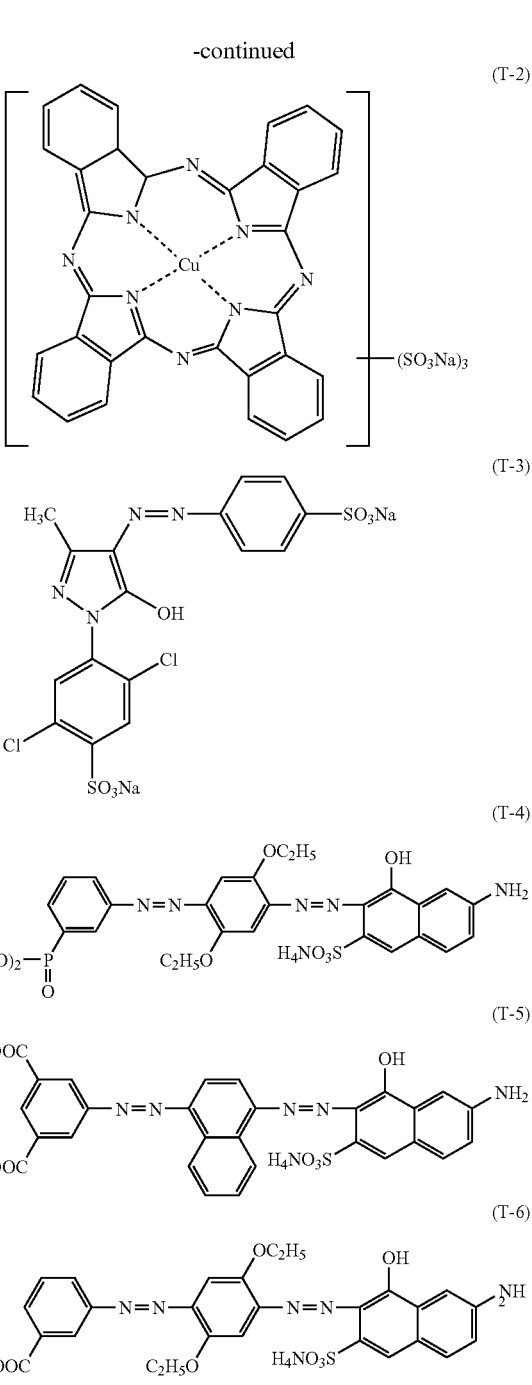

(Image Recording and Evaluation)

Ink Sets 101 to 113 each was filled in a cartridge of an inkjet printer PM770C (manufactured by Seiko Epson Corporation) and an image and letters were printed on Inkjet Paper PM produced by Seiko Epson Corporation using the same printer. The following evaluations were performed.

<Light Fastness>

The chromaticity (a*1, b*1) and lightness (L1) immediately after the printing were measured using SPM100-II manufactured by Gretag Corp. Also, after irradiation for 7 days with xenon light (85,000 lux) using a weather meter manufactured by Atlas Co., the chromaticity (a*2, b*2) and lightness (L2) were again measured. The color difference (ΔE) between before and after the light irradiation was obtained according to the following formula and evaluated.

$$\Delta E = \{(a^*1-a^*2)^2 + (b^*1-b^*2)^2 + (L1-L2)^2\}^{1/2}$$

The color difference was evaluated at three points having a reflection density of 1.0, 1.3 and 1.6. The light fastness was rated "A" when the color difference was less than 5 at all density points, rated "B" when the color difference was less than 5 at two density points, rated "C" when the color difference was less than 5 at one density point, and rated "D" when the color density was 5 or more at all density points.

<Heat Fastness>

The sample was stored for 6 days under the condition of 80° C. and the color difference between before and after the storage was evaluated in the same manner as in the evaluation of light fastness. The dye residual percentage was evaluated at three points having a reflection density of 1.0, 1.3 and 1.6. The heat fastness was rated "A" when the color difference was less than 3 at all density points, rated "B" when the color difference was less than 3 at two density points, rated "C" when the color difference was less than 3 at one density point, and rated "D" when the color difference was 3 or more at all density points.

<Ozone Resistance>

The sample was stored in a box set to an ozone gas concentration of 0.5 ppm for 7 days and the color difference between before and after the storage was evaluated in the same manner as in the evaluation of light fastness. The dye residual percentage was evaluated at three points having a reflection density of 1.0, 1.3 and 1.6. The ozone resistance was rated "A" when the color difference was less than 10 at all density points, rated "B" when the color difference was less than 10 at two density points, rated "C" when the color difference was less than 10 at one density point, and rated "D" when the color difference was 10 or more at all density points. The ozone gas concentration in the box was set using an ozone gas monitor (Model OZG-EM-01) manufactured by APPLICS.

TABLE 3

| Ink Set | Light Fastness | Heat Fastness | Ozone Resistance |
|---|---|---|---|
| 101 | D | D | D |
| 102 | C | C | C |
| 103 | C | B | C |
| 104 | B | B | C |
| 105 | B | B | B |
| 106 | A | A | A |
| 107 | A | A | A |
| 108 | A | A | A |
| 109 | A | A | A |
| 110 | A | A | A |
| 111 | A | A | A |
| 112 | A | A | A |
| 113 | A | A | A |
| 114 | A | A | A |

It is seen from the results shown in Table 3 that when the ink composition of the present invention is used, excellent performance is obtained particularly in the fastness.

The same effect as above is obtained even when the image-receiving paper used in the present invention is changed to Inkjet Paper GASAI Photo Finish produced by Fuji Photo Film Co., Ltd. or PR101 produced by Canon Inc.

Example 2

The same ink as produced in Example 1 was filled in an inkjet printer BJ-F850 (manufactured by Canon Inc.) and an image was printed on Inkjet Paper GASAI Photo Finish produced by Fuji Photo Film Co., Ltd. in the same printer and evaluated in the same manner as in Example 1, as a result, similar results to those in Example 1 were obtained. Also, the same effect as above was obtained even when the image-receiving paper was changed to PM photographic paper produced by Seiko Epson Corporation or PR101 produced by Canon Inc.

Example 3

Preparation of Black Ink

Bonjet Black CW-1 (produced by Orient Chemical Industries, Ltd.) was diluted with water to a pigment concentration of 10 wt % and then centrifuged (7,000 rpm, 30 minutes) to obtain a pigment dispersion solution (pigment concentration: 8.3 wt %).

| | |
|---|---|
| Pigment dispersion prepared above | 50 wt % |
| Diethylene glycol | 15 wt % |
| Urea | 5 wt % |
| $C_4H_9(CH_2CH_2O)_2H$ | 2 wt % |
| Surfactant (OLIFIN E1010, produced by Nisshin Kagaku) | 1 wt% |
| Pure water | 27 wt % |

While thoroughly mixing these components, 1N of an aqueous sodium hydroxide solution was added dropwise until the pH reached 7.5. The resulting solution was filtered under pressure through a 1-μm filter to obtain Black Ink A comprising a self-dispersible pigment.

Ink Set 114 was prepared in the same manner as Ink Set 106 of Example 1 except for changing the black ink of Ink Set 106 to Black Ink A prepared above using a self-dispersible pigment. Then, printing and evaluation were performed in the same manner as in Example 1. The results are shown in Table 3. It is seen that even a pigment is used as the black dye, the color balance is free from serious disruption due to discoloration by light or ozone.

Example 4

Ink Set 201 was prepared by changing the light magenta, magenta, light cyan, cyan and yellow inks in Ink Set 101 of Example 1 to oil-soluble dye inks prepared as follows.

Dye (M-26) (8 g) and 60 g of a surfactant (Emal 20C, trade name, produced by Kao Corporation) were dissolved in 6 g of high boiling point organic solvent (S-1), 10 g of high boiling point organic solvent (S-2), 1.0 g of additive (A-1) and 50 ml of ethyl acetate at 70° C. To the resulting solution, 500 ml of deionized water was added while stirring with a magnetic stirrer to produce an oil-in-water coarse particle dispersion.

This coarse particle dispersion was passed 5 times through Microfluidizer (manufactured by Microfluidex Inc.) under a pressure of 60 MPa to form the coarse particles into fine particles. The resulting emulsified product was then treated in a rotary evaporator to remove the solvent until the odor of ethyl acetate was not generated.

To the thus-obtained finely emulsified product of hydrophobic dye, 140 g of diethylene glycol, 64 g of glycerin and additives such as urea were added. Then, deionized water was added to make a total amount of 1 liter and the pH was adjusted to 9 with 10 mol/liter of KOH to prepare a light magenta ink having a concentration shown in Table 4. The volume average particle size of the obtained emulsification dispersion ink was measured by Microtrac UPA (manufactured by Nikkiso) and found to be 40 nm.

Furthermore, a magenta ink, a light cyan ink, a cyan ink and a yellow ink of Ink Set 201 shown in Table 4 were prepared by changing the kind and amount of the dye used, the amount of the high boiling point organic solvent used and the kind and amount of each additive used. Here, in Table 4, a composition of the final composition product after the evaporation of solvent is shown.

The black ink used was Bonjet Black CW-1 (produced by Orient Chemical Industries, Ltd.) described in Example 3, which is a self-dispersible pigment.

TABLE 4

|  | Light Magenta | Magenta | Light Cyan | Cyan | Yellow |
|---|---|---|---|---|---|
| Dye (g/liter) | M-26 | M-26 | C-26 | C-26 | Y-42 |
|  | 5.00 | 20.0 | 11.2 | 44.6 | 27.2 |
| High boiling point organic solvent (g/liter) | S-1 3.75 S-2 6.25 | 14.52 25.52 | 8.1 14.3 | 32.4 57.1 | 20.0 34.5 |
| Additive A-1 (g/liter) | 0.625 | 2.5 | 1.2 | 4.8 | 3.2 |
| Emal 20C (g/liter) | 38.0 | 120 | 46.5 | 186.0 | 150 |
| Diethylene glycol (g/liter) | 87.5 | 87.5 | 87.5 | 87.5 | 87.5 |
| Glycerin (g/liter) | 40 | 40 | 40 | 40 | 40 |
| SURFYNOL 465 (g/liter) | 10.0 | 10.0 | 10.0 | 10.0 | 10.0 |
| Triethanolamine (g/liter) | 7.5 | 7.5 | 7.5 | 7.5 | 7.5 |
| Benzotriazole (g/liter) | 0.075 | 0.075 | 0.075 | 0.075 | 0.075 |
| Proxel XL2 (g/liter) | 2.5 | 2.5 | 2.5 | 2.5 | 2.5 |
| Deionized water was added to make 1 liter. |  |  |  |  |  |
| Volume average particle size | 40 nm | 45 nm | 35 nm | 41 nm | 38 nm |

Solvents S-1 and S-2 and Additive A-1 in Table 4 are shown below.

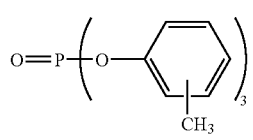

(S-1)

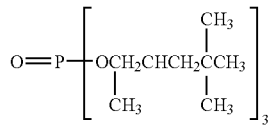

(S-2)

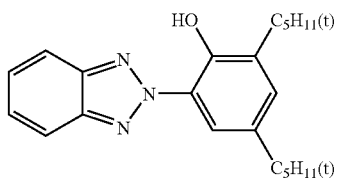

(A-1)

Ink Sets 202 to 212 were produced in the same manner as Sample 201 except for changing the dye species in each ink solution as shown in Table 5 below. In changing the dye, the dye is basically changed by an equimolar amount of a dye and the dye concentration of each ink solution was adjusted to give the same transmission density as in Ink Set 201.

TABLE 5

| Ink Set | Light Magenta | Magenta | Light Cyan | Cyan | Yellow | Remarks |
|---|---|---|---|---|---|---|
| 201 | M-26 | M-26 | C-26 | C-26 | Y-42 | Invention |
| 202 | M-28 | M-28 | C-26 | C-26 | Y-42 | " |
| 203 | M-29 | M-26 | C-27 | C-26 | Y-42 | " |
| 204 | M-31 | M-31 | C-26 | C-26 | Y-42 | " |
| 205 | M-41 | M-26 | C-26 | C-26 | Y-42 | " |
| 206 | M-26 | M-26 | C-32 | C-26 | Y-43 | " |
| 207 | M-27 | M-27 | C-26 | C-78 | Y-43 | " |
| 208 | M-26 | M-26 | C-76 | C-84 | Y-44 | " |
| 209 | M-59 | M-59 | C-26 | C-26 | Y-45 | " |
| 210 | T-8 | T-8 | C-26 | C-26 | T-9 | Comparison |
| 211 | T-10 | T-10 | C-26 | C-26 | T-9 | " |
| 212 | T-8 | T-8 | T-11 | T-11 | T-9 | " |

Dyes T-8 to T-11 for comparison in Table 5 are shown below.

T-8:

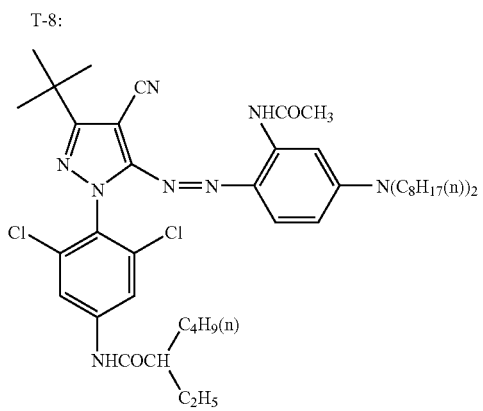

Compound M-21 of JP-A-2002-121440

T-9:

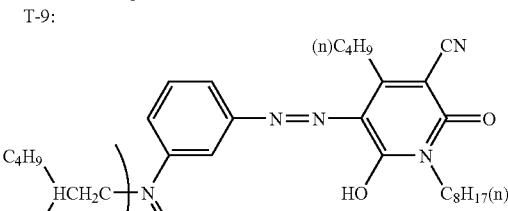

NO. 83 OF JP-A-2001-146562

T-10:

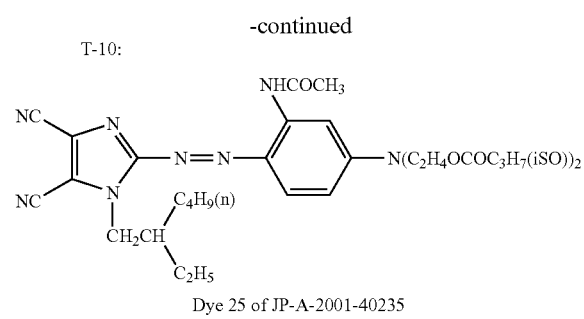

Dye 25 of JP-A-2001-40235

T-11:

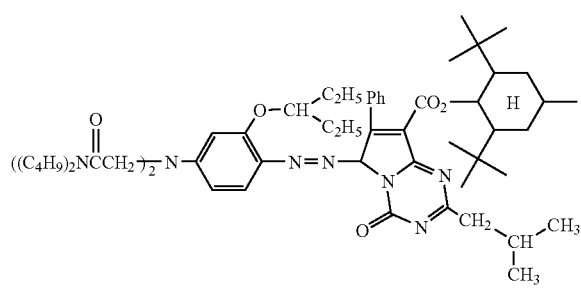

Compound 36-(7) in Example 12 of JP-A-2002-20641

Ink Sets 201 to 209 each was filled in a cartridge of an inkjet printer PM770C (manufactured by Seiko Epson Corporation) and an image was printed on Inkjet Paper GASAI Photo Finish produced by Fuji Photo Film Co., Ltd. using the same printer. The following evaluations were performed. Sample 101 of Example 1 was also evaluated under the same conditions.

<Water Resistance>

The obtained image was dipped in deionized water for 60 seconds and then the blurring of image was evaluated with an eye.

The water resistance was rated "A" when the blurring of image was not observed at all, rated "B" when the blurring was slightly observed, and rated "C" when the blurring was not in an allowable level.

As for the fastness of image, a gray printed sample was produced and evaluated as follows.

<Light Fastness (Light Resistance)>

The chromaticity (a*1, b*1) and lightness (L1) immediately after the printing were measured using SPM100-II manufactured by Gretag Corp. Also, after irradiation for 14 days with xenon light (85,000 lux) using a weather meter manufactured by Atlas Co., the chromaticity (a*2, b*2) and lightness (L2) were again measured. The color difference (ΔE) between before and after the light irradiation was obtained according to the following formula and evaluated.

$$\Delta E = \{(a*1-a*2)^2 + (b*1-b*2)^2 + (L1-L2)^2\}^{1/2}$$

The color difference was evaluated at three points having a reflection density of 1.0, 1.3 and 1.6. The light fastness was rated "A" when the color difference was less than 5 at all density points, rated "B" when the color difference was less than 5 at two density points, rated "C" when the color difference was less than 5 at one density point, and rated "D" when the color density was 5 or more at all density points.

<Heat Fastness (Beat Resistance)>

The sample was stored for 6 days under the condition of 85° C. and the color difference between before and after the storage was evaluated in the same manner as in the evaluation of light fastness. The dye residual percentage was evaluated at three points having a reflection density of 1.0, 1.3 and 1.6. The heat fastness was rated "A" when the color difference was less than 3 at all density points, rated "B" when the color difference was less than 3 at two density points, rated "C" when the color difference was less than 3 at one density point, and rated "D" when the color difference was 3 or more at all density points.

<Ozone Resistance>

The sample was stored in a box set to an ozone gas concentration of 1.00 ppm for 7 days and the color difference between before and after the storage was evaluated in the same manner as in the evaluation of light fastness. The dye residual percentage was evaluated at three points having a reflection density of 1.0, 1.3 and 1.6. The ozone resistance was rated "A" when the color difference was less than 10 at all density points, rated "B" when the color difference was less than 10 at two density points, rated "C" when the color difference was less than 10 at one density point, and rated "D" when the color difference was 10 or more at all density points. The ozone gas concentration in the box was set using an ozone gas monitor (Model OZG-EM-01) manufactured by APPLICS.

TABLE 6

| Ink Set | Water Resistance | Light Fastness | Heat Fastness | Ozone Resistance |
| --- | --- | --- | --- | --- |
| 201 | A | A | A | A |
| 202 | A | A | A | A |
| 204 | A | A | A | A |
| 203 | A | A | A | A |
| 205 | A | A | A | A |
| 206 | A | A | A | A |
| 207 | A | A | A | A |
| 208 | A | A | A | A |
| 209 | A | A | A | A |
| 210 | A | B | B | D |
| 211 | A | B | B | D |
| 212 | A | C | C | D |
| 101 | B | D | D | D |

It is seen from the results shown in Table 6 that when the ink composition of the present invention is used as the oil-soluble dye dispersion, excellent performance is attained particularly in the fastness. Also, excellent performance is attained in the water resistance which is a problem for a water-soluble ink.

Incidentally, the same effect as above is obtained even when the image-receiving paper used in the present invention is changed to PM photographic paper produced by Seiko Epson Corporation or PR101 produced by Canon Inc.

Example 5

The same ink as produced in Example 4 was filled in an inkjet printer BJ-F850 (manufactured by Canon Inc.) and an image was printed on Inkjet Paper GASAI Photo Finish produced by Fuji Photo Film Co., Ltd. in the same printer and evaluated in the same manner as in Example, as a result, similar results to those in Example 3 were obtained. Also, the same effect as above was obtained even when the image-receiving paper was changed to PM photographic paper produced by Seiko Epson Corporation or PR101 produced by Canon Inc.

INDUSTRIAL APPLICABILITY

According to the present invention, an azo dye having a specific structure capable of drastically solving the ozone discoloration is used as a dye constituting an ink, whereby an inkjet recording ink capable of giving a color image having excellent fastness to ozone gas is provided and an ink set for inkjet recording and an inkjet recording method, which can form an image having excellent color reproducibility and high light fastness, are provided.

The invention claimed is:

1. An ink set for inkjet recording, comprising:
a yellow ink containing at least one yellow dye;
a magenta ink containing at least one magenta dye; and
a cyan ink containing at least one cyan dye,
wherein at least one dye of the yellow, magenta and cyan dyes contains an azo dye represented by the following formula (1):

A-N=N-B wherein A and B each independently represents an aromatic group, or a 5- or 6-membered unsaturated heterocyclic group, provided that a substituent on each ring of A and B, which is located at a conjugated position with respect to the azo group satisfies the following conditions (a) to (c):
(a) the substituent is not a hydroxyl group,
(b) when the substituent is an amino group, the amino group does not have a hydrogen atom at the α-position, and
(c) when the substituent is an ether group, the ether group does not have a hydrogen atom at the α-position; and
wherein the cyan dye comprises a cyan dye represented by the following formula (3):

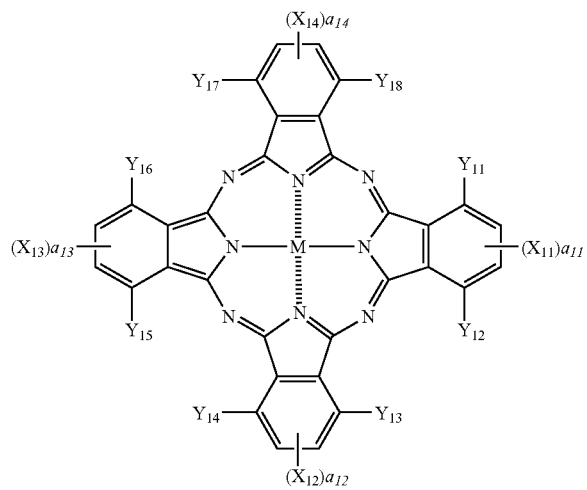

wherein $X_{11}$ to $X_{14}$ each independently represents an electron-withdrawing group having a σp value of 0.40 or more; $Y_{11}$ to $Y_{18}$ each independently represents a monovalent substituent; M represents a hydrogen atom, a metal element or its oxide, hydroxide or halide; and $a_{11}$ to $a_{14}$ each independently represents an integer of 1 or 2.

2. The ink set for inkjet recording as claimed in claim 1, wherein at least one of A and B in the formula (1) represents a 5- or 6-membered unsaturated heterocyclic group.

3. The ink set for inkjet recording as claimed in claim 1, wherein the azo dye represented by the formula (1) contains an electron-withdrawing group.

4. The ink set for inkjet recording as claimed in claim 1, wherein the amino group not having a hydrogen atom at the α-position is an amino group substituted by a tertiary alkyl group, an aryl group, a heterocyclic group or an unsubstituted amino group.

5. The ink set for inkjet recording as claimed in claim 1, wherein the ether group not having a hydrogen atom at the α-position is an aryloxy group or a heteryloxy group.

6. An inkjet recording method comprising forming an image using the ink set for inkjet recording claimed in claim 1.

7. The inkjet recording method as claimed in claim 6, which comprises forming an image on an image-receiving material comprising a support having thereon an image-receiving layer containing a white inorganic pigment particle.

8. An ink set for inkjet recording, comprising:
a yellow ink containing at least one yellow dye;
a magenta ink containing at least one magenta dye;
a cyan ink containing at least one cyan dye; and
a black ink containing at least one black dye,
wherein at least one dye of the yellow, magenta, cyan and black dyes contains an azo dye represents by the following formula (1):

A-N=N-B wherein A and B each independently represents an aromatic group, or a 5- or 6-membered unsaturated heterocyclic group, provided that a substituent on each ring of A and B, which is located at a conjugated position with respect to the azo group, satisfies the following conditions (a) to (c):
(a) the substituent is not a hydroxyl group,
(b) when the substituent is an amino group, the amino group does not have a hydrogen atom at the α-position, and
(c) when the substituent is an ether group, the ether group does not have a hydrogen atom at the α-position; and
wherein the cyan dye comprises a cyan dye represented by the following formula (3):

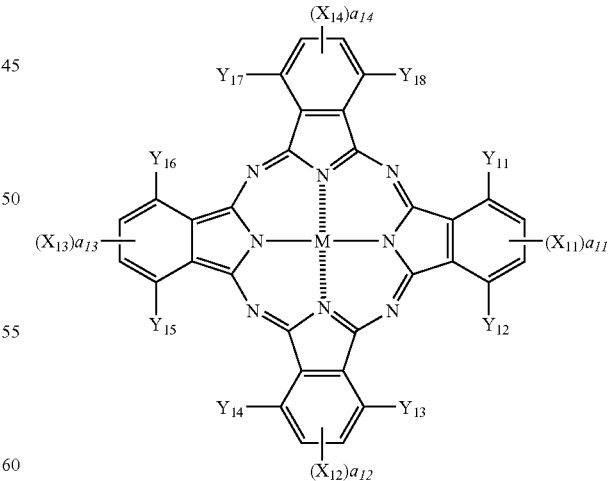

wherein $X_{11}$ to $X_{14}$ each independently represents an electron-withdrawing group having a σp value of 0.40 or more; $Y_{11}$ to $Y_{18}$ each independently represents a monovalent substituent; M represents a hydrogen atom, a metal element or its oxide, hydroxide or halide; and $a_{11}$ to $a_{14}$ each independently represents an integer of 1 or 2.

9. An inkjet recording method comprising forming an image using the ink set for inkjet recording claimed in claim 8.

10. The inkjet recording method as claimed in claim 9, which comprises forming an image on an image-receiving material comprising a support having thereon an image-receiving layer containing a white inorganic pigment particle.

* * * * *